US008659786B2

(12) United States Patent
Soulard

(10) Patent No.: US 8,659,786 B2
(45) Date of Patent: Feb. 25, 2014

(54) CURVE VECTORIZATION WITH PRESERVED TANGENTS AT ENDPOINTS

(75) Inventor: Hervé Soulard, Beacon Hill (AU)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 13/450,085

(22) Filed: Apr. 18, 2012

(65) Prior Publication Data

US 2012/0268794 A1 Oct. 25, 2012

(30) Foreign Application Priority Data

Apr. 21, 2011 (AU) .................................. 2011202072

(51) Int. Cl.
*G06F 15/00* (2006.01)
(52) U.S. Cl.
USPC ......................................................... 358/1.18
(58) Field of Classification Search
USPC ......................................................... 358/1.18
See application file for complete search history.

(56) References Cited

U.S. PATENT DOCUMENTS 6,654,713 B1 11/2003 Rethman et al.
2013/0120382 A1* 5/2013 Joshi et al. ..................... 345/423

FOREIGN PATENT DOCUMENTS

EP 0534622 B1 8/1997

* cited by examiner

*Primary Examiner* — Saeid Ebrahimi Dehkordy
(74) *Attorney, Agent, or Firm* — Canon U.S.A. Inc. IP Division

(57) ABSTRACT

A method of vectoring a curve having an endpoint and a tangent associated with the curve at the endpoint. The method determines a first point on the curve following the endpoint where a perpendicular distance between a first linear segment, joining the first point and the endpoint, and the curve, does not exceed a tolerance. A second point on the tangent is then determined for which a perpendicular distance from the first segment to the second point does not exceed the tolerance. The curve is then vectorized by a path formed of a plurality of linear segments, the plurality of linear segments comprising at least a second segment joining the endpoint and the second point, and a third segment joining the second point to the first point.

20 Claims, 17 Drawing Sheets

CURVE VECTORIZATION WITH PRESERVED TANGENTS AT ENDPOINTS

FIELD OF THE INVENTION

The present invention relates to computer graphics rendering and, more particularly, to methods, systems and computer programs for vectorizing a curve.

DESCRIPTION OF THE RELATED ART

It is common for electronic documents to contain curved lines (e.g. fonts, vector graphics). When these documents need to be rendered for display or for printing by a computing system, the curved lines may need to be stroked. Stroking of lines involves rendering a desired visual line characteristic along a defined line path. Stroking for example may establish a width of a line, a colour and perhaps transparency, amongst other graphic features. It is often necessary to convert the curves into a series of connected vectors (straight lines) which becomes labelled as a path. Since the curve is approximated by a series of straight lines, there exists a level of error between the approximated path and the original curve. Existing computing systems, particularly in Raster Image Processors (RIP), approximate the curve based on a parameter known as the flatness tolerance, which defines the maximum amount of error the approximated path can deviate away from the original curve. Ideally, the flatness tolerance is chosen such that the errors between the original curve and the approximated path of lines are not noticeable to the end user. The slope of the tangents that pass through the endpoints of the curve are not preserved in this approximation. Since the slope of the tangents at the endpoints of the curve are not preserved, significant noticeable errors can occur whenever end butt caps are used, or when the path endpoints are joined to other lines or curves using mitre joins or round joins. These significant noticeable errors can make a displayed or printed job unsatisfactory.

Thus there exists a need to overcome, or at least ameliorate, the disadvantage of existing curve approximation algorithms used in computing systems, and in particular RIPs.

SUMMARY OF THE INVENTION

According to one aspect of the present disclosure, there is provided a method of vectoring a curve having an endpoint and a tangent associated with the curve at the endpoint. The method determines a first point on the curve following the endpoint where a perpendicular distance between a first linear segment, joining the first point and the endpoint, and the curve, does not exceed a tolerance. A second point on the tangent is then determined for which a perpendicular distance from the first segment to the second point does not exceed the tolerance. The curve is then vectorized by a path formed of a plurality of linear segments, the plurality of linear segments comprising at least a second segment joining the endpoint and the second point, and a third segment joining the second point to the first point.

According to another aspect there is provided a method of vectorizing a curve, the curve having an endpoint and a tangent associated with the curve at the endpoint. This method determines a first point on the tangent for which a distance from the endpoint to the first point is associated with a flatness tolerance for vectorization. The method determines a second point on the curve following the endpoint where a maximum perpendicular distance from a line to the curve does not exceed the flatness tolerance, the line joining the second point and the endpoint. The method then vectorizes the curve by a path formed of a plurality of linear segments, the plurality of segments comprising at least a first segment joining the endpoint and the first point, and characterised by a second segment joining the first point to the second point and crossing the curve.

Other aspects and variations are also disclosed.

BRIEF DESCRIPTION OF THE DRAWINGS

At least one embodiment of the present invention will now be described with reference to the following drawings, in which.

DETAILED DESCRIPTION OF THE EMBODIMENTS

Figure 1A:
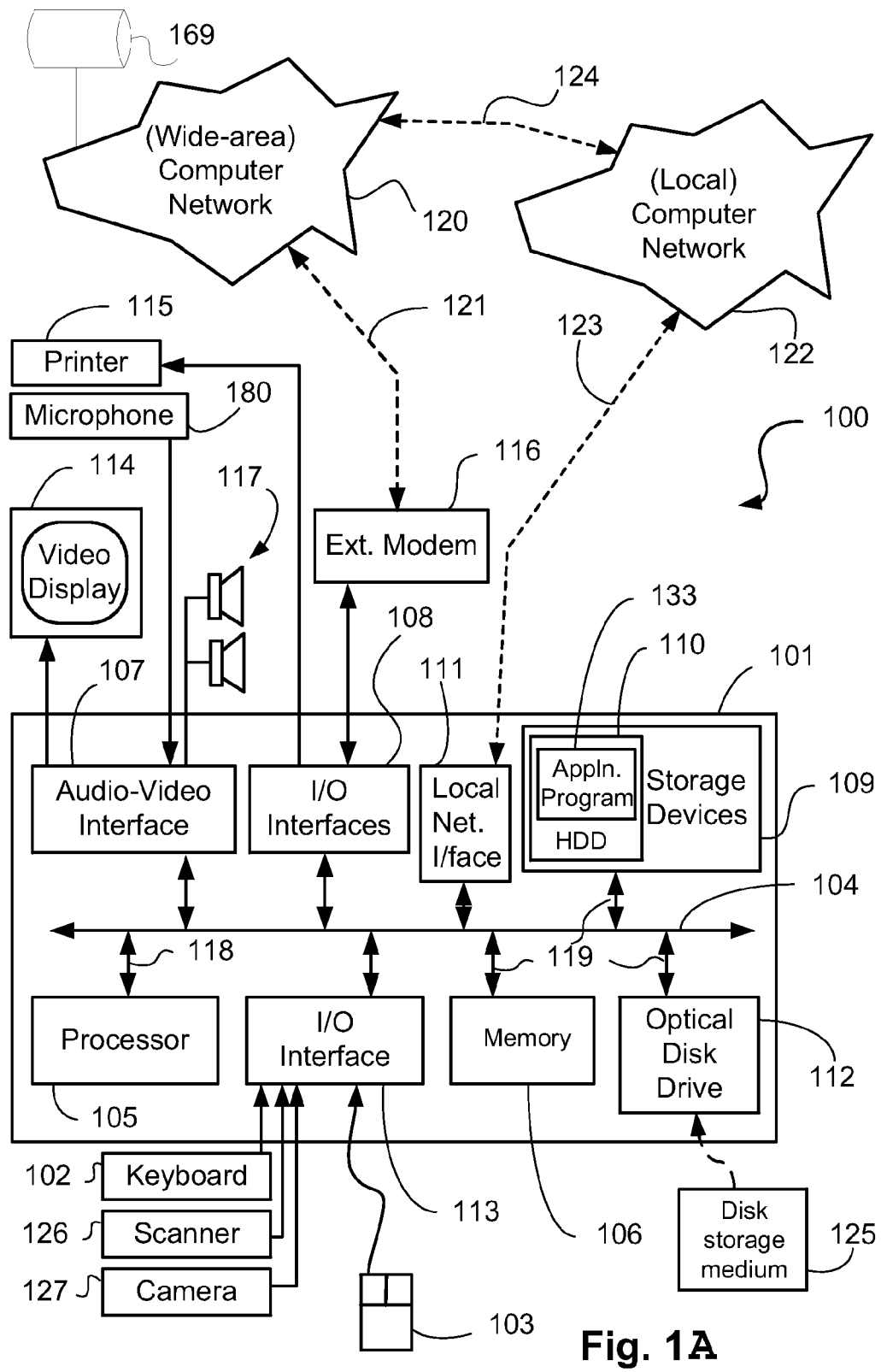
FIGS. 1A and 1B collectively form a schematic block diagram of a data processing architecture useful in the arrangements to be described.
Figure 1B:
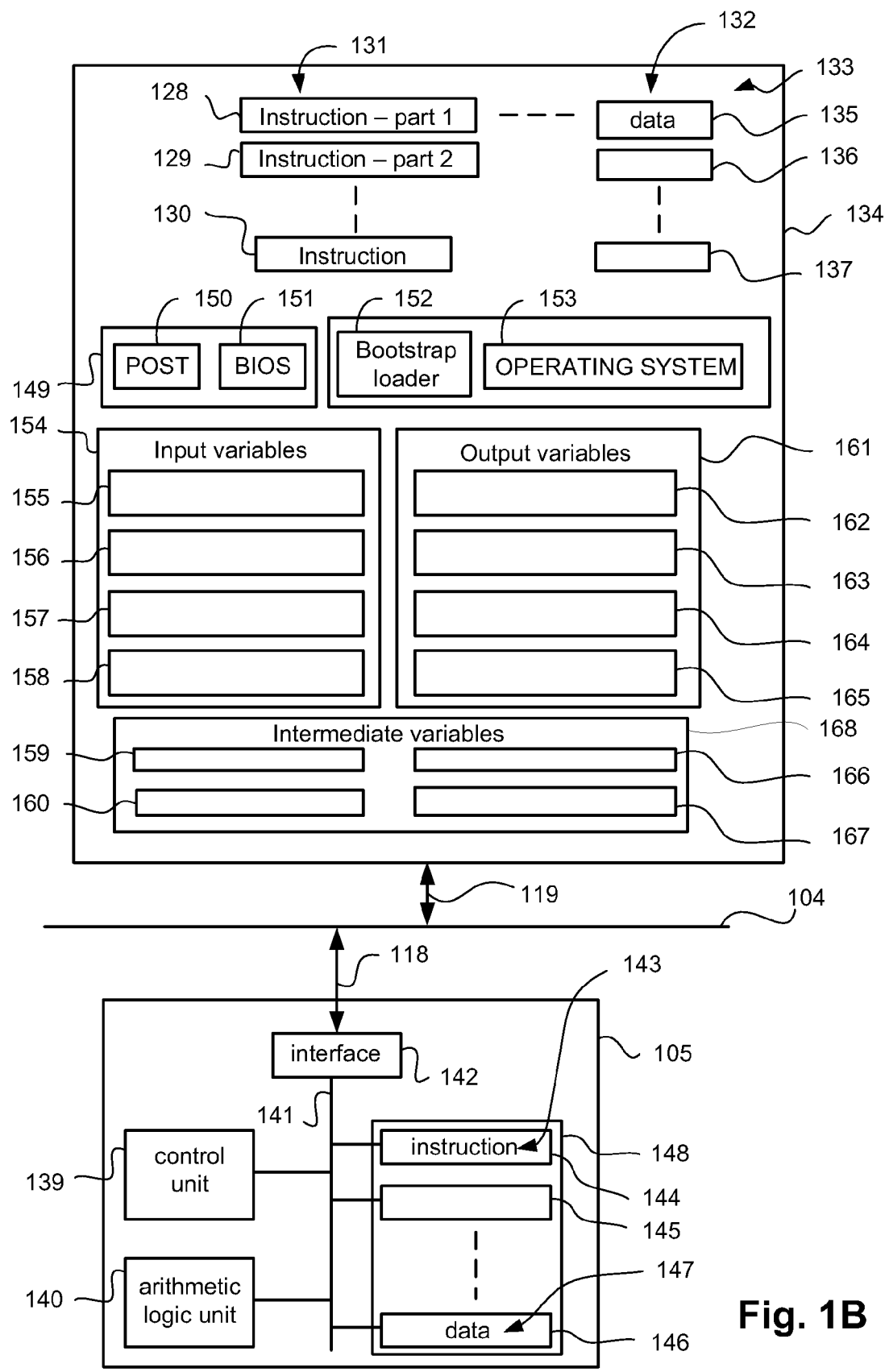

FIGS. 1A and 1B collectively form a schematic block diagram of a general purpose computer system 100, upon which various curve vectorization arrangements to be described may be practiced.

As seen in FIG. 1A, the computer system 100 is formed by a computer module 101, input devices such as a keyboard 102, a mouse pointer device 103, a scanner 126, a camera 127, and a microphone 180, and output devices including the printer 115, a display device 114 and loudspeakers 117. An external Modulator-Demodulator (Modem) transceiver device 116 may be used by the computer module 101 for communicating to and from a communications network 120 via a connection 121. The network 120 may be a wide-area network (WAN), such as the Internet or a private WAN. Where the connection 121 is a telephone line, the modem 116 may be a traditional "dial-up" modem. Alternatively, where the connection 121 is a high capacity (e.g.: cable) connection, the modem 116 may be a broadband modem. A wireless modem may also be used for wireless connection to the network 120.

The computer module 101 typically includes at least one processor unit 105, and a memory unit 106, for example formed from semiconductor random access memory (RAM) and semiconductor read only memory (ROM). The module 101 also includes an number of input/output (I/O) interfaces including an audio-video interface 107 that couples to the video display 114, loudspeakers 117 and microphone 180, an I/O interface 113 for the keyboard 102, mouse 103, scanner 126, camera 127 and optionally a joystick (not illustrated), and an interface 108 for the external modem 116 and printer 115. In some implementations, the modem 116 may be incorporated within the computer module 101, for example within the interface 108. The computer module 101 also has a local network interface 111 which, via a connection 123, permits coupling of the computer system 100 to a local computer network 122, known as a Local Area Network (LAN). As also illustrated, the local network 122 may also couple to the wide network 120 via a connection 124, which would typically include a so-called "firewall" device or device of similar functionality. The interface 111 may be formed by an Ethernet™ circuit card, a Bluetooth™ wireless arrangement or an IEEE 802.11 wireless arrangement.

The interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (eg: CD-ROM, DVD), USB-RAM, and floppy disks for example may then be used as appropriate sources of data to the system 100.

The components 105 to 113 of the computer module 101 typically communicate via an interconnected bus 104 and in a manner which results in a conventional mode of operation of the computer system 100 known to those in the relevant art. Examples of computers on which the described arrangements may be practised include IBM-PC's and compatibles, Sun Sparcstations, Apple Mac™ or alike computer systems evolved therefrom.

Curve vectorization may be implemented using the computer system 100 wherein the processes of FIGS. 4, 9, 12, 13 and 17, to be described, may be implemented as one or more software application programs 133 for curve vectorization and printing executable within the computer system 100. In particular, the steps of the curve vectorization processes are effected by instructions 131 in the software 133 that are carried out within the computer system 100. The software instructions 131 may be formed as one or more code modules, each for performing one or more particular tasks. The software may also be divided into two separate parts, in which a first part and the corresponding code modules performs the curve vectorization and a second part and the corresponding code modules manage a user interface between the first part and the user.

The software 133 is generally loaded into the computer system 100 from a computer readable medium, and is then typically stored in the HDD 110, as illustrated in FIG. 1A, or the memory 106, after which the software 133 can be executed by the computer system 100. In some instances, the printing application programs 133 may be supplied to the user encoded on one or more CD-ROM 125 and read via the corresponding drive 112 prior to storage in the memory 110 or 106. Alternatively the curve vectorization software 133 may be read by the computer system 100 from the networks 120 or 122 or loaded into the computer system 100 from other computer readable media. Computer readable storage media refers to any non-transitory tangible storage medium that participates in providing instructions and/or data to the computer system 100 for execution and/or processing. Examples of such storage media include floppy disks, magnetic tape, CD-ROM, a hard disk drive, a ROM or integrated circuit, USB memory, a magneto-optical disk, or a computer readable card such as a PCMCIA card and the like, whether or not such devices are internal or external of the computer module 101. Examples of transitory non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the printing application programs 133 and the corresponding code modules mentioned above may be executed to implement one or more graphical user interfaces (GUIs) to be rendered or otherwise represented upon the display 114, for example. Through manipulation of typically the keyboard 102 and the mouse 103, a user of the computer system 100 and the curve vectorization application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

FIG. 1B is a detailed schematic block diagram of the processor 105 and a "memory" 134. The memory 134 represents a logical aggregation of all the memory devices (including the HDD 110 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106. A program permanently stored in a hardware device such as the ROM 149 is sometimes referred to as firmware. The POST program 150 examines hardware within the computer module 101 to ensure proper functioning, and typically checks the processor 105, the memory (109, 106), and a basic input-output systems software (BIOS) module 151, also typically stored in the ROM 149, for correct operation. Once the POST program 150 has run successfully, the BIOS 151 activates the hard disk drive 110. Activation of the hard disk drive 110 causes a bootstrap loader program 152 that is resident on the hard disk drive 110 to execute via the processor 105. This loads an operating system 153 into the RAM memory 106 upon which the operating system 153 commences operation. The operating system 153 is a system level application, executable by the processor 105, to fulfil various high level functions, including processor management, memory management, device management, storage management, software application interface, and generic user interface.

The operating system 153 manages the memory (109, 106) in order to ensure that each process or application running on the computer module 101 has sufficient memory in which to execute without colliding with memory allocated to another process. Furthermore, the different types of memory available in the system 100 should be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

The processor 105 includes a number of functional modules including a control unit 139, an arithmetic logic unit (ALU) 140, and a local or internal memory 148, sometimes called a cache memory. The cache memory 148 typically includes a number of storage registers 144-146 in a register section. One or more internal buses 141 functionally interconnect these functional modules. The processor 105 typically also has one or more interfaces 142 for communicating with external devices via the system bus 104, using a connection 118.

The printing application program 133 includes a sequence of instructions 131 that may include conditional branch and loop instructions. The program 133 may also include data 132 which is used in execution of the program 133. The instructions 131 and the data 132 are stored in memory locations 128-130 and 135-137 respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128-129.

In general, the processor 105 is given a set of instructions which are executed therein. The processor 105 then waits for a subsequent input, to which it reacts to by executing another set of instructions. Each input may be provided from one or more of a number of sources, including data generated by one or more of the input devices 102, 103, data received from an external source across one of the networks 120, 122, data retrieved from one of the storage devices 106, 109 or data retrieved from a storage medium 125 inserted into the corresponding reader 112. The execution of a set of the instructions may in some cases result in output of data. Execution may also involve storing data or variables to the memory 134.

The disclosed curve vectorization arrangements may use input variables 154 (such as 710 in FIG. 7 for example), that are stored in the memory 134 in corresponding memory locations 155-158. Examples of input variables 154 that may be used in the disclosed curve vectorization arrangements include:

(i) Control points 210, 220, 230 and 240; and
(ii) Flatness tolerance.

The curve vectorization arrangements produce output variables 161 that are stored in the memory 134 in corresponding memory locations 162-165. Examples of output variables 161 that may be used in the disclosed curve vectorization arrangements include:

(i) an output path array 810 in which is stored an output path of the vectorized curve.

Intermediate variables 168 may be stored in memory locations 159, 160, 166 and 167. Examples of intermediate variables 168 that may be used in the disclosed curve vectorization arrangements include:

(i) minimum sample step values;
(ii) length calculations;
(iii) index to the output path array;
(iv) curve function parameter values;
(v) loop counters;
(vi) endpoint sample steps; and
(vii) endpoint flatness tolerances.

The register section 144-146, the arithmetic logic unit (ALU) 140, and the control unit 139 of the processor 105 work together to perform sequences of micro-operations needed to perform "fetch, decode, and execute" cycles for every instruction in the instruction set making up the curve vectorization program 133. Each fetch, decode, and execute cycle includes:

(a) a fetch operation, which fetches or reads an instruction 131 from a memory location 128;
(b) a decode operation in which the control unit 139 determines which instruction has been fetched; and
(c) an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Each step or sub-process in the processes of FIGS. 4, 9, 12, 13 and 17 is associated with one or more segments of the curve vectorization program 133, and is performed by the register section 144-147, the ALU 140, and the control unit 139 in the processor 105 working together to perform the fetch, decode, and execute cycles for every instruction in the instruction set for the noted segments of the program 133.

The curve vectorization method may alternatively be implemented in dedicated hardware such as one or more gate arrays and/or integrated circuits performing the curve vectorization functions or sub functions. Such dedicated hardware may also include graphic processors, digital signal processors, or one or more microprocessors and associated memories. If gate arrays are used, the process flow charts in FIGS. 4, 9, 12, 13 and 17 may be converted to Hardware Description Language (HDL) form. This HDL description may be converted to a device level netlist which is used by a Place and Route (P&R) tool to produce a file which is downloaded to the gate array to program the gate array with the design specified in the HDL description.

Although the curve vectorization arrangement in FIGS. 4, 9, 12, 13 and 17 shows the curve vectorization process being effected in a general purpose computer system 101, the curve vectorization arrangement may also be implemented in the printer 115 or elsewhere in a networked system, such as in an embedded device. The curve vectorization arrangements may also be implemented using other arrangements of functional modules.

Figure 17:
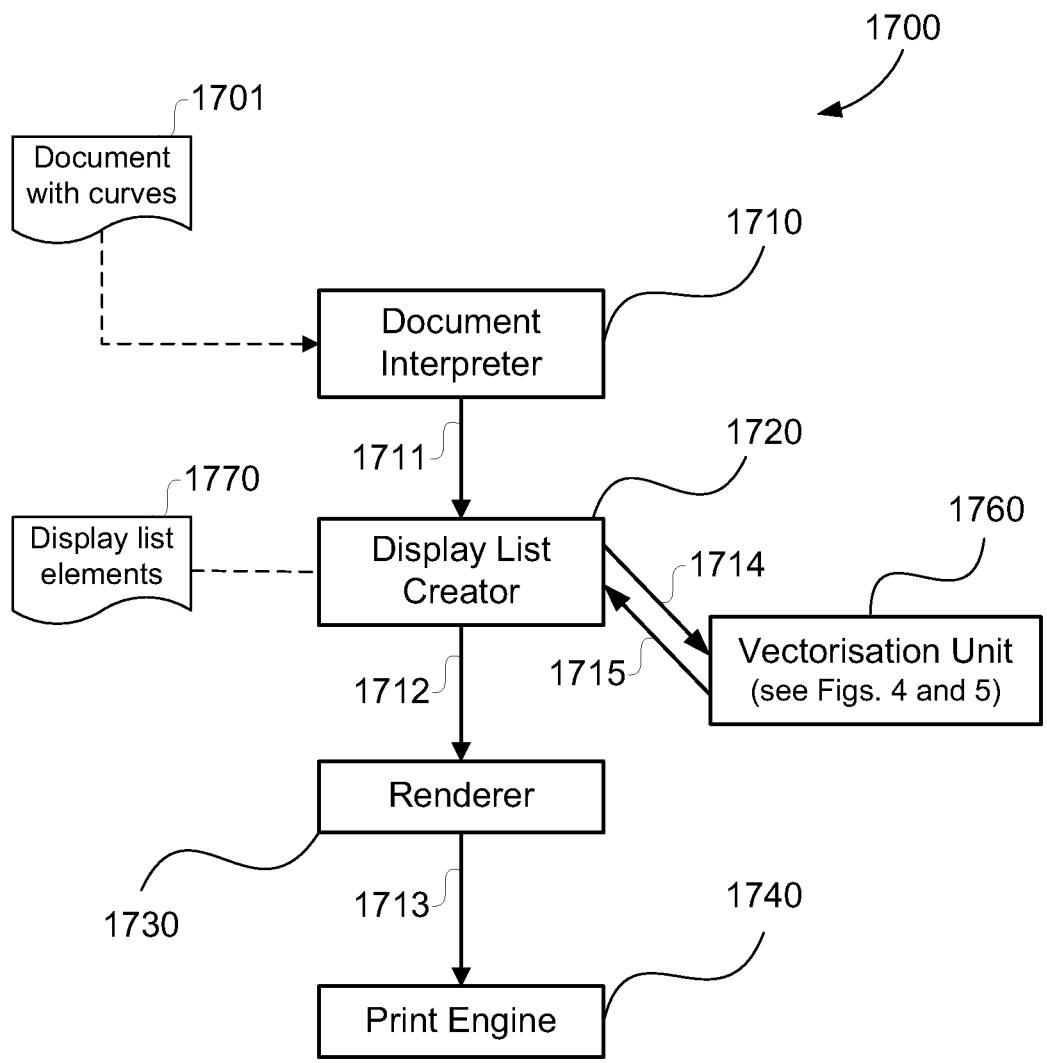
FIG. 17 is a schematic block diagram of a printing arrangement according to the present disclosure.

FIG. 17 is a functional block diagram of a printing arrangement 1700. The printing arrangement 1700 may be implemented at least in part by the printing application program 133 referred to above and may be invoked when a printing function is selected by another application (not shown) executing on the computer system 100. That other application may be any source of printable data containing a curve such as a word processing application, a browser, a graphics drawing package, and so forth.

The printing arrangement 1700 operates on a page description of a page that is to be printed. The page to be printed may comprise a curve. In this regard, the printing arrangement 1700 may in part execute within the computer module 101 to interpret and render the page description of the curve into line (linear) segments for reproduction on the printer 115. Alternatively the printing arrangement 1700 may execute within the printer 115 which receives a page description from the computer module 101 and, in this implementation, the printer 115 performs the document interpreting and rendering as part of a print reproduction process.

In the printing arrangement 1700 illustrated, a document comprising an input curve 1701 that is submitted for printing is received from the computer module 101 and interpreted by a document interpreter 1710. The document interpreter 1710 generates drawing commands which are sent, as depicted by an arrow 1711, to a display list creator 1720. The display list creator 1720 translates the drawing commands into display list elements 1770. When a display list for a single page is completed, the display list is sent, as depicted by an arrow 1712 to a renderer 1730 for rendering. The display list is in a format that can be easily processed by the renderer 1730. The renderer 1730 processes the display list and generates pixel data which is sent, as depicted by an arrow 1713 to a print engine 1740 in the printer 115 for printing the pixel data onto a hard copy medium, such as paper or film. The document interpreter 1710, the display list creator 1720 and the renderer 1730 may implemented as software modules in the software application 133 executable on the computer module 101, or as a separate purpose-designed hardware (or hybrid hardware/software) module configured and operable within the printer 115.

The Display List Creator 1720 stores display list elements in the memory 106 as the display list is built. When the display list is completed, the display list may be stored in the memory 106 or 110 and is sent, as depicted by the arrow 1712, to the renderer 1730. The renderer 1730 reads the display list elements from the memory 106. The renderer 1730 in the presently described implementations is configured to render straight lines, and as such, all the curve drawing commands passed from the document interpreter 1710 must be converted by the display list creator 1720 into straight lines. This conversion is done by the vectorization unit 1760. The display list creator 1720 passes the necessary data describing the curve, as depicted by the arrow 1714, into the vectorization unit 1760. The vectorization unit 1760 converts the curve into a series of straight line, linear, segments, collectively known as a path, and returns data describing the path, as depicted by the line 1715, to the display list creator 1720 for inclusion into the display list elements 1770. The "path" may also be known as the "vectorized path", or the "vectorized curve". The vectorization unit 1760 represents the process to be described with reference to FIGS. 4, 9, 12 and 13.

An exemplary implementation will be described using Bezier curves for showing the entire process. The arrangements to be described however are not limited to operation upon Bezier curves, but can apply to any splines or curves with known endpoints and calculable tangents to the endpoints. This can include, for example, elliptical curves.

The exemplary implementation is described with reference to points, curves, lines and segments in drawing space. The points, lines and segments are eventually converted to pixel space by the display list creator 1720.

Figure 2:
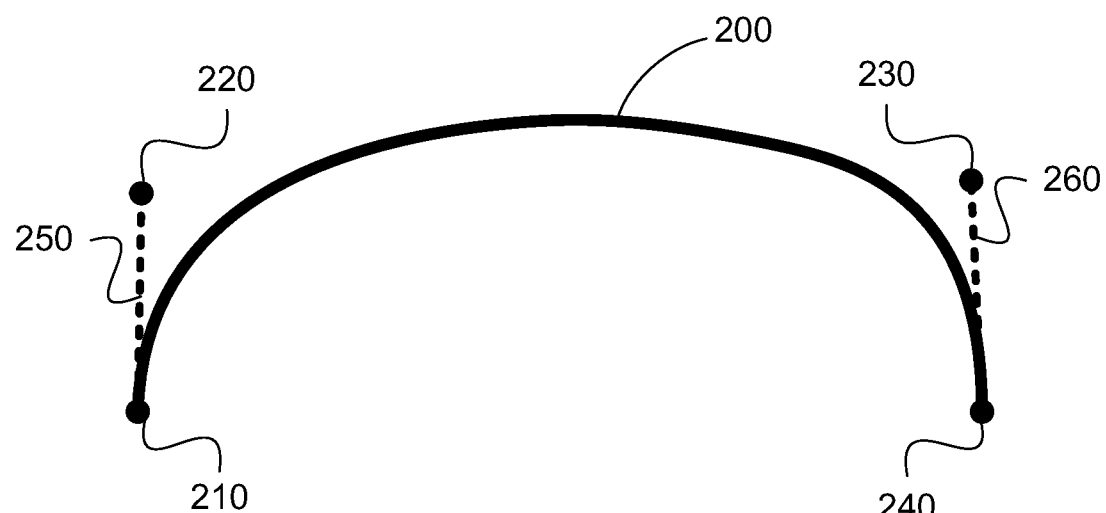
FIG. 2 is an example of a cubic Bezier curve having four control points.

FIG. 2 shows the basic components of a cubic Bezier curve. A Bezier curve 200 is defined by four points. The four points consist of two endpoints 210 and 240, and two control points 220 and 230. Each point will now be given a name to aid in this description. The point 210 will be called the starting point, A, the point 220 is the starting control point, B; the point 230 is the ending control point, C, and the point 240 is the ending point, D. A line segment 250 is formed between points A 210 and B 220, and is tangential to the point A 210. The line segment 250 will be referred to as the starting tangent segment. Similarly a line segment 260 formed by and between the points C 230 and D 240 is tangential to the point D 240 and will be referred to as the ending tangent segment.

The flatness tolerance defines the maximum perpendicular distance permitted between the input curve and the approximation of straight line segments, being the path mentioned above. In order for a vectorized curve to satisfy the flatness tolerance, all points along the vectorized path must be within the flatness tolerance distance to the input curve.

Figure 4:
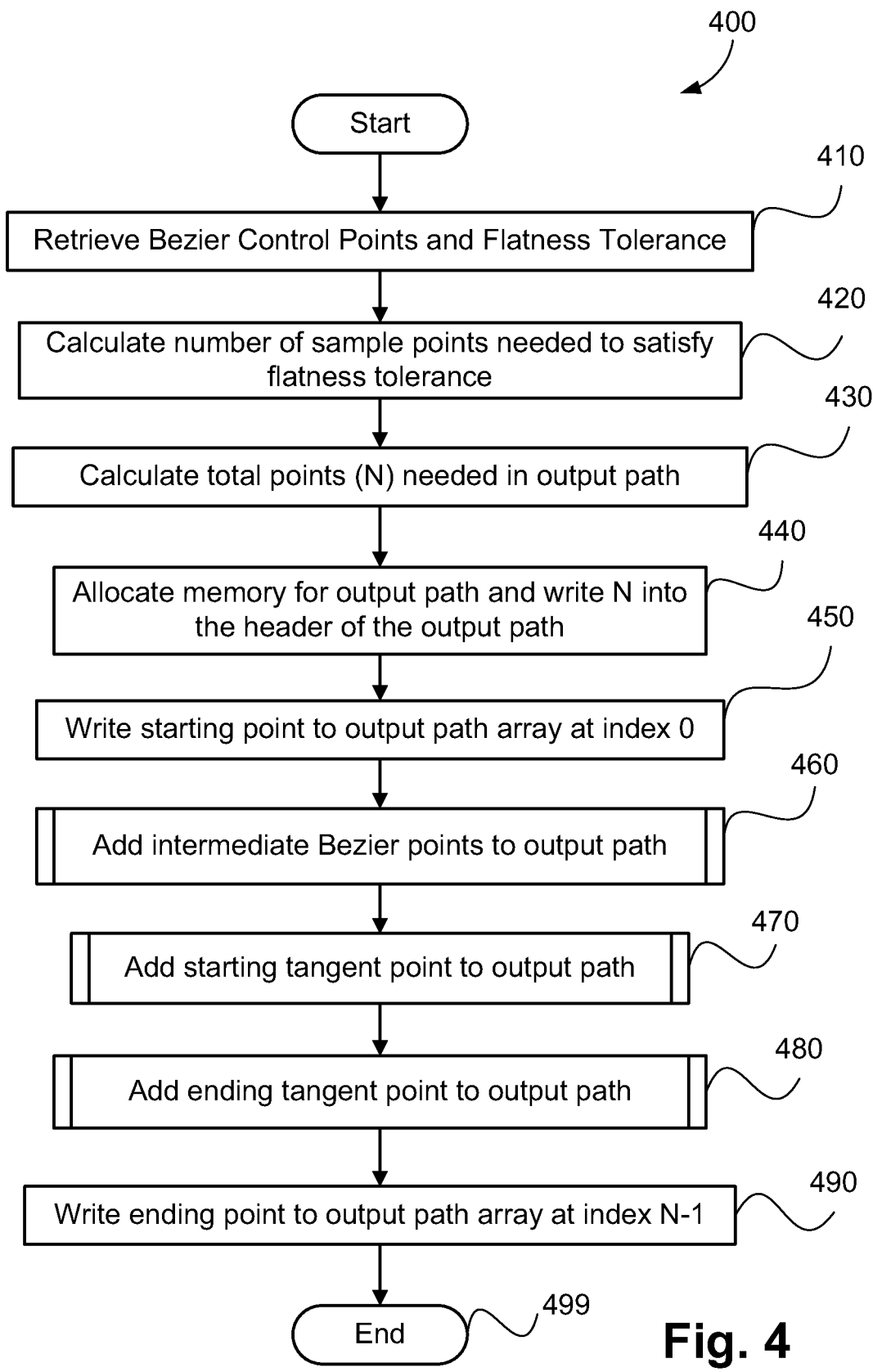
FIG. 4 is a schematic flow diagram of a curve vectorization method implementable in the computer system of FIGS. 1A and 1B and which produces a piecewise linear approximation of a curve.

A schematic block flow diagram of a curve vectorization process 400 specific for Bezier curves is shown in FIG. 4 that is performed by the vectorization unit 1760. The process 400 is typically implemented as software executable on the computer system 100 but may be implemented, as appropriate, within the printer 115. A first step 410 of the process 400 involves the processor 105 accessing and retrieving the Bezier control points and flatness tolerance from within the memory unit 106. Typically such values are determined based on information stored as part of the display list elements 1770. Step 420 then follows by which the processor unit 105 performs a sample step calculation that is used to vectorize the Bezier curve such that the flatness tolerance is satisfied by the resulting vectorization. Step 420 involves the calculation of a number of sample points that provide for the vectorized path to satisfy the retrieved flatness tolerance. The number of sample points is desirably a minimum number, in order to reduce computational overhead and determination of such is discussed further below. The next step, 430, uses the processor unit 105 to calculate a total number of points (N) needed in the output path. In step 440 which follows, the processor 105 allocates memory capacity for an output path array structure in the memory unit 106 by which the output path is stored, and writes the number of points calculated in step 430 into a header of the output path array structure. Coordinates from the starting point of the input curve, A, are copied to a first element of the output path structure (indexed at 0) in step 450. Step 460 proceeds to calculate, using the processor 105, a number of intermediate points for the vectorized curve and write them into the output path array structure, leaving a gap in the array structure for the starting tangent point. The starting tangent point and ending tangent points are calculated on the processor 105 and written into the allocated output path array structure in steps 470 and 480 respectively. A final step 490 of the process 400 writes the ending point D into the last element of the output path array structure at the index position (N−1). Once step 490 is complete, the curve vectorization process 400 ends at step 499.

Figure 5:
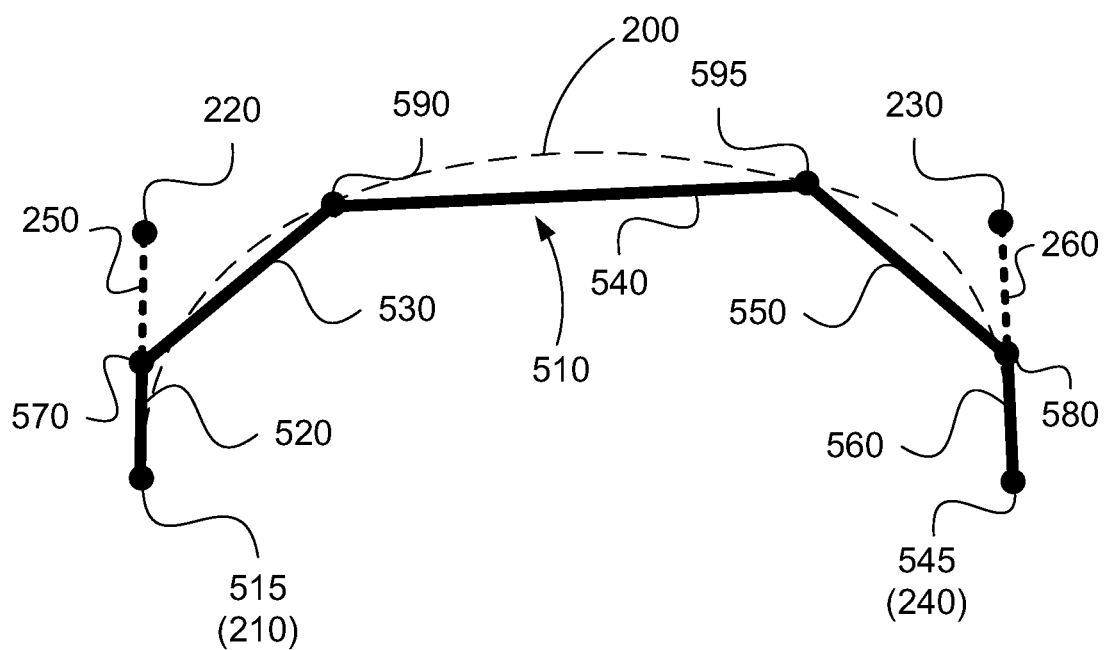
FIG. 5 is an example of a vectorized curve generated by the curve vectorization method of FIG. 4.

FIG. 5 illustrates an example output of the process of FIG. 4 when input with the Bezier curve 200 shown in FIG. 2 and as a dashed line in FIG. 5. As seen in FIG. 5, an output path 510 is formed which includes an extra point 570 inserted on the starting tangent segment 250, and which forms a second point in the output path 510. This point 570 is called the starting tangent point. A corresponding extra point, 580, on the ending tangent segment 260 is also added and forms the second last point in the output path 510. This point 580 is called the ending tangent point. Because the points 570 and 580 lie on tangents to the corresponding endpoints 515 and 545, the points 570 and 580 do not lie on the curve 200. Step 460 provides for the generation of, in this example two, intermediate points 590 and 595 that lie on the input curve 200. The overall output path 510 now consists of a starting point 515, corresponding to the starting point 210, the extra point 570, the two generated intermediate points 590 and 595, the extra point 580 and the ending point 545, corresponding to the ending point 240. The points form a sequence extending from the endpoint 515 along the curve 200 and concluding at the endpoint 545 to thereby define straight line segments 520, 530, 540, 550 and 560 which make up the entire output path 510. It should be noted that the two line segments 520 and 560 are parallel to and coincident with the tangents 250 and 260 respectively, and thus the slope of the tangents at the endpoints 515 and 545 of the vectorized output path 510 are preserved from the original input Bezier curve 200. As will be appreciated from FIG. 5, the segments 530 and 550 each cross the curve 200, causing the vectorization path to transit from the convex (outside) side of the curve 200 to the concave (inside) of the curve 200. In this example, crossing occurs with the second segments. However, in many cases crossing will occur at the point 590 and/or the point 595. In such cases the second segment is on one side (concave/convex) and the third segment on the other (convex/concave). This is seen in FIG. 5 where the crossing of the curve 200 occurs at the point 590, due predominantly to the position of the point 570 on the tangent 250.

Figure 6:
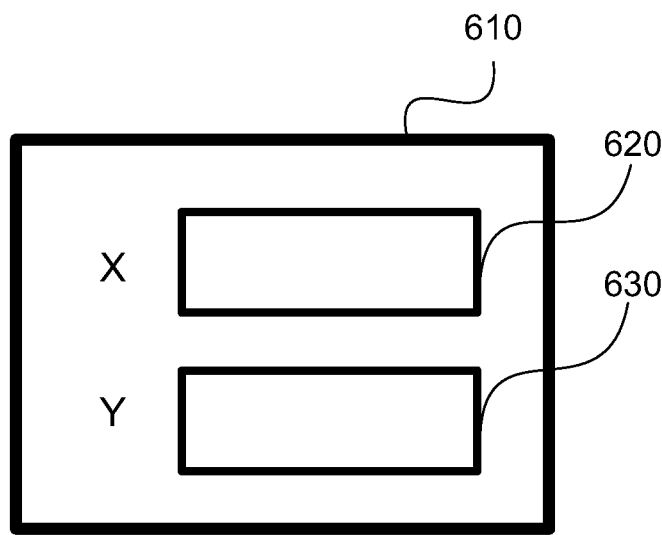
FIG. 6 is a memory data structure that is used to store data on points.

FIG. 6 shows a preferred arrangement for representing a point in the memory unit 106. A point in a printable document has X and Y coordinates and may be represented by a point data structure 610 having two double-precision floating point values 620 and 630 for storing the X and Y coordinates respectively of the point.

Figure 7:
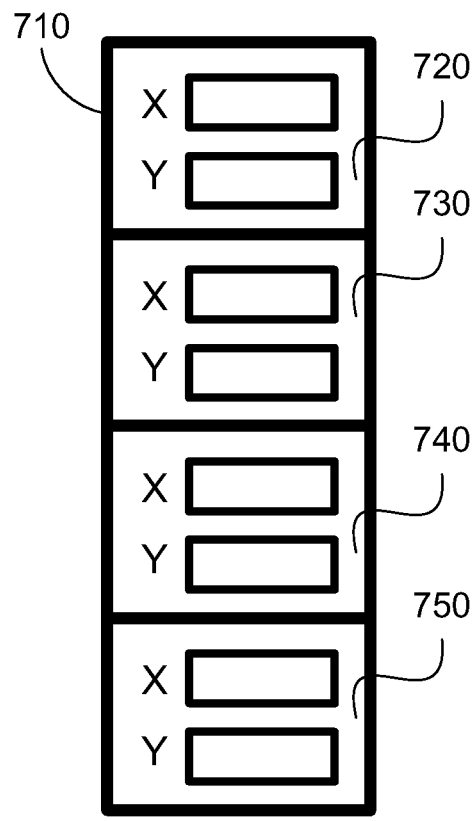
FIG. 7 is a memory data structure that is used to store the control points of a cubic Bezier curve.

FIG. 7 shows a preferred arrangement for representing an input Bezier curve in the memory unit 106. The four control points: A, B, C and D defining a Bezier curve are stored in a four element array 710 of the point data structures 610. A first element 720 of the array 710 will store the XY-coordinates of point A. The second element 730 of the array will store the XY-coordinates of the point B, the third element 740 of the array will store the XY-coordinates of the point C, and the fourth element 750 of the array will store the XY-coordinates of the point D.

Figure 8:
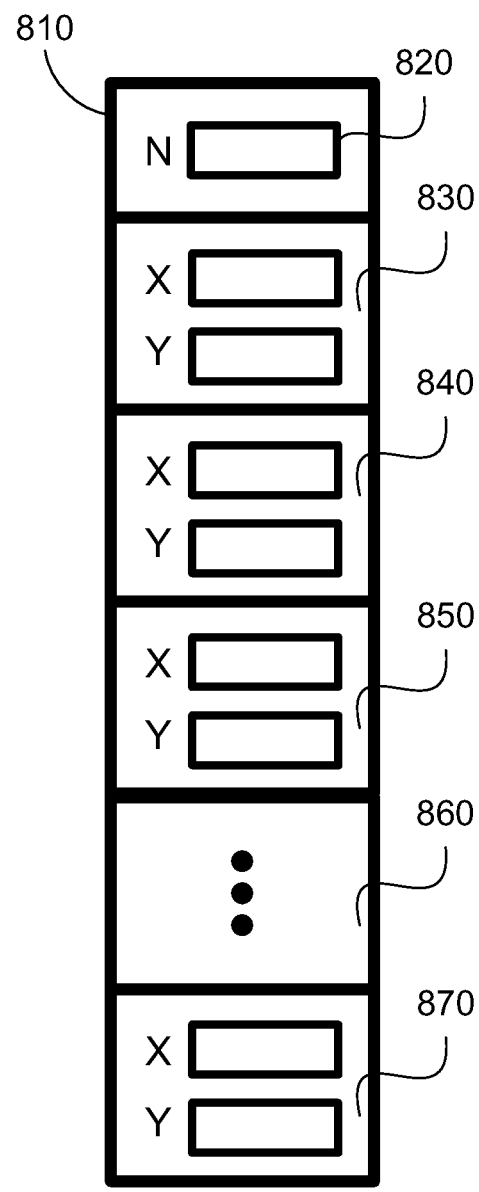
FIG. 8 is a memory data structure that is used to store data on a series of points defining a path of line segments.

FIG. 8 shows a preferred output path array structure 810 for representing the output vectorized path as formed in the memory unit 106. Since the number of points in a vectorized path is variable, the output path array structure 810 begins with a header 820 to store a count (N) of the number of points contained within the array structure 810. The header 820 is then followed by a series of corresponding point data structures, which map out a sequence of draw points that define the line segments that represent the output path. The first line segment is defined by the first two point structures 830 and 840. The next line segment is defined by the point structures 840 and 850 and so on, as represented by 860, until the final segment ends at the last point described by the point structure 870.

Step 410 of the process 400 operates to retrieve a value for the flatness tolerance and a Bezier structure in the form of 710 from the memory unit 106. The structure 710 contains the coordinates of the control points for the input Bezier curve.

The flatness tolerance is a simple number, which may represent a maximum number of pixels between the input Bezier curve and pixel locations on the output path, including the points making up the whole vectorization (i.e. all points on all segments). The flatness tolerance may also be a distance measure.

Step 420 will now be described in more detail. In order to calculate the minimum number of sample points needed to satisfy the flatness tolerance, a sampling step needs to be calculated. The sampling step is defined as a value between 0 and 1 which is used as a step-size for iterating from the value 0 to 1, and substituted into the parametric form of the equation of a curve in order to find vectorization points. In the case of a cubic Bezier curve, the parametric equation is defined as:

$$B(t)=A(1-t)^3+3Bt(1-t)^2+3Ct^2(1-t)+Dt^3 \qquad \text{(Eqn. 1)}$$

where t is a subset of the domain 0,1.

For convenience, the starting point of a Bezier curve can be defined as B(0) and the ending point of a Bezier curve can be defined as B(1).

As the sampling step decreases in magnitude, more iterations will occur between the values 0 and 1, and hence the curve vectorization will be represented by more sample points. The overall approximation of the vectorized curve to the original curve will increase in accuracy with more sample points. The sample step is ideally chosen such that the minimum number of sample points is used to vectorize the curve, whilst having the entire output path satisfy the flatness tolerance value received in step 410.

There are many methods that can calculate a sampling step that will guarantee that the flatness tolerance is satisfied. In preferred implementation, the sampling step is calculated using the processor 105 and the data in the Bezier curve structure 710 to evaluate the following equation:

$$\text{Sample step} = \text{MIN}\left(1, \sqrt{\frac{8 \cdot err}{6 \cdot \text{MAX}(\|(B - 2C + D)\|, \|(A - 2B + C)\|)}}\right) \qquad \text{(Eqn. 2)}$$

where err is the flatness tolerance, and A, B, C, D correspond to the control points 210, 220, 230, 240 respectively, and $\|\vec{v}\|$ define the Euclidean norm of v.

Once the result has been calculated, the result is stored in memory 106. The minimum number of sample points is then calculated using the processor 105 with the following equation:

$$\text{Minimum number of sample points} = \lceil 1.0/\text{samplestep} \rceil + 1. \qquad \text{(Eqn. 3)}$$

The result of this calculation is also stored in memory 106, and step 420 ends.

Once the minimum number of sample points is calculated, the process 400 proceeds to step 430, where the total number of points (N) needed in the output path is calculated. In a preferred implementation, the total number of points (N) needed in the output path is the minimum number of sample points needed (calculated in step 420) increased by three. The extra three points required are due to the inclusion of the following points:

(1) The starting tangent point (described later using FIG. 12);

(2) The ending tangent point (described later using FIG. 13); and (3) An extra vectorization point that is needed to guarantee that the flatness tolerance is satisfied at the endpoints of the vectorized path (described later using FIG. 9).

Once N is calculated, step 430 finishes and step 440 starts. Instructions are executed by the processor 105 to allocate enough memory for an output path array structure 810 that can store N points. When the output path array structure 810 is allocated, N is written into the header position 820, and step 440 ends.

Step 450 copies the X and Y values stored in the starting control point 720 of the input Bezier curve retrieved from step 410 into the first point structure element in the output path structure 810. Once this is complete, the process 400 moves onto step 460.

Step 460 will be described in more detail using FIGS. 9 and 10. FIG. 9 shows a schematic block flow diagram of a sub-process 900, being a preferred form of step 460, and FIG. 10 shows how the parameter value is to be divided in the interval between 0 and 1 in order to produce the sample points for the Bezier curve.

Figure 9:
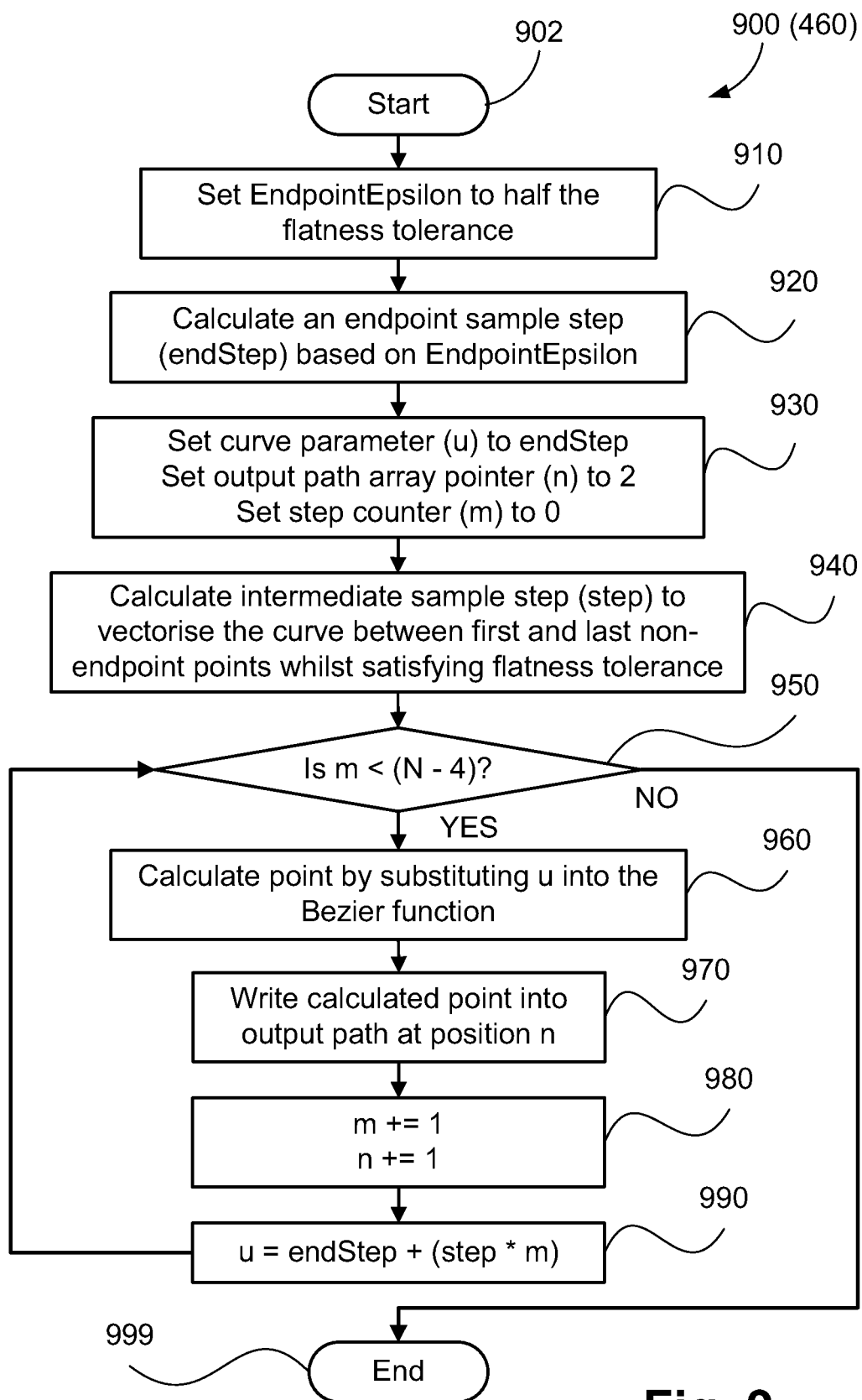
FIG. 9 is a flow diagram describing a process for calculating intermediate points along a Bezier curve and writing them to the output path.
Figure 10:
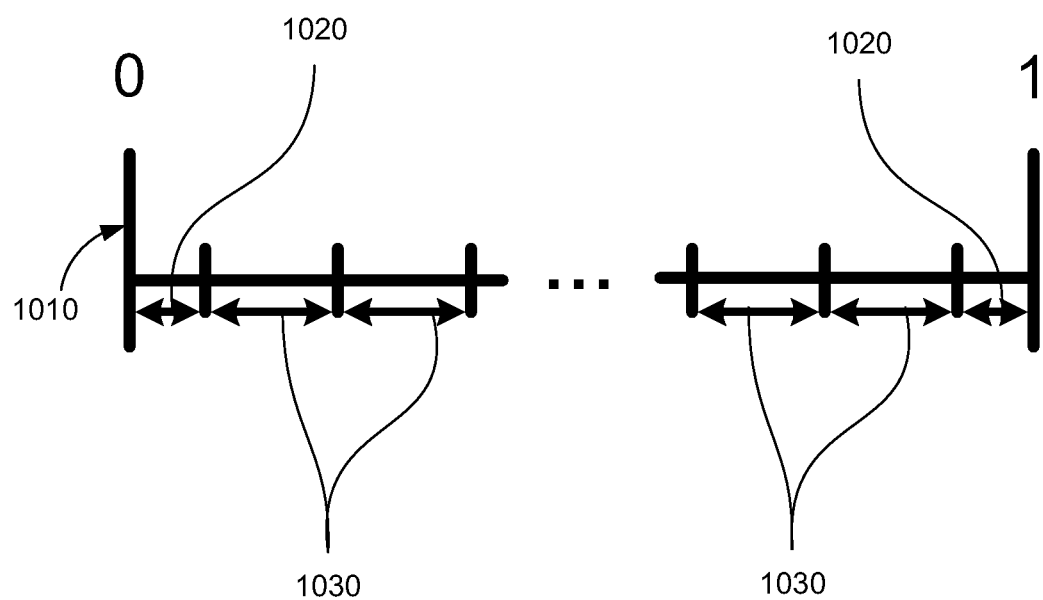
FIG. 10 is a number line describing how the domain of the parameterised curve function can be divided.

As seen in FIG. 9, the sub-process 900 includes an entry step 902 and processing begins with step 910 where a new value, referred to as the endpoint epsilon, is stored into the memory unit 106. The endpoint epsilon is set to be half the value of the flatness tolerance. Once this is done, the sub-process moves onto step 920 where a new value, endpoint sample step, is calculated by the processor 105 and stored into the memory unit 106. One formula for determining the endpoint sample step is:

$$\text{Endpoint sample step} = \text{MIN}\left(1, \sqrt{\frac{8 \cdot err}{12 \cdot \text{MAX}(\|(B - 2C + D)\|, \|(A - 2B + C)\|)}}\right) \quad \text{(Eqn. 4)}$$

However, in an exemplary implementation, this value can be alternatively calculated by simply dividing the sample step calculated in step 430 by the square root of two.

The next step, 930 involves setting up variables in the memory unit 106 to control a processing loop used by the processor 105 to calculate all the intermediate curve points. A curve parameter variable (u) is defined to have the value of the endpoint sample step. An output path array index variable (n) is set to be 2 (noting that the output path array starts with an index of 0), and a loop counter variable (m) is defined with a value of 0. Step 930 finishes once the values are all initialised and stored in the memory 106.

Step 940 calculates an intermediate sample step to use between the third and third-last points in the vectorized output path. This is necessary as the sample step in this part of the path does not have to be as small as the sample step required at the endpoints to satisfy the flatness tolerance. FIG. 10 shows a number line 1010 that represents the domain of the parameterised Bezier function, which is the range of 0 to 1. As illustrated, endpoint sample steps 1020 are smaller than intermediate sample steps 1030. The intermediate sample step 1030 must still be smaller than the sample step calculated in step 430. In the preferred implementation, in order to maintain equidistant intervals, the intermediate sample step 1030 is defined as:

$$\text{Intermediate sample step} = \frac{1.0 - 2(\text{endpoint stample step})}{\lceil (1.0 - 2(\text{endpoint sample step}))/\text{sample step} \rceil} \quad \text{(Eqn. 5)}$$

This calculation is performed on the processor 105 and the result is stored in memory 106 for the processing loop of steps 950 to 990 that follows.

Steps 950 to 990 form a loop that calculates points along the Bezier curve to use in the output path. Step 950 is a decision step where the processor 105 checks if a loop counter, m, stored in the memory 106, is less than (N−4). The (N−4) value corresponds to the total number of points in the output path minus the starting point, the starting tangent point, the ending tangent point, and the ending point. If decision of step 950 evaluates to YES, then the process 900 proceeds to step 960. If the decision of step 950 evaluates to NO, the process 900 ends at step 999. Step 960 involves using the processor 105 to calculate the X and Y values for a point on the Bezier curve by substituting the curve parameter value, u, initially set at step 930, into the parameterised cubic Bezier function described previously (Eqn. 1). Particularly, on the first traversal of the loop of steps 950-990, step 960 determines a first point on the Bezier curve immediately following the endpoint. Further traversals of the loop result in vectorizing the curve by determining a second point immediately consecutive the first point along the curve. The first and second points thus define a segment of the vectorization of the curve. It is in this fashion that the intermediate points 590 and 595 of FIG. 5 are determined to lie on the curve 200 based on an appropriate step size and by which the corresponding vectorized segment 540 is defined. Once the result for the point is calculated by step 960, step 970 is performed where the result is written into the output path array 810 in the position indexed by the output path array index, n.

In the next step, 980, the processor 105 increments the values for loop counter, m, and the output path array index variable, n, stored in the memory 106. Step 990 then proceeds by the processor 105 calculating and writing a new value for u using the equation:

$$u = (\text{endpoint step}) + ((\text{intermediate sample step}) * m). \quad \text{(Eqn. 6)}$$

Once the value of u is written into memory 106, the process 900 returns to the decision 950 where the termination condition is rechecked. Once m reaches the value (N−4), the process 900 will end at step 999 and hence the sub-process 460 ends.

Figure 11:
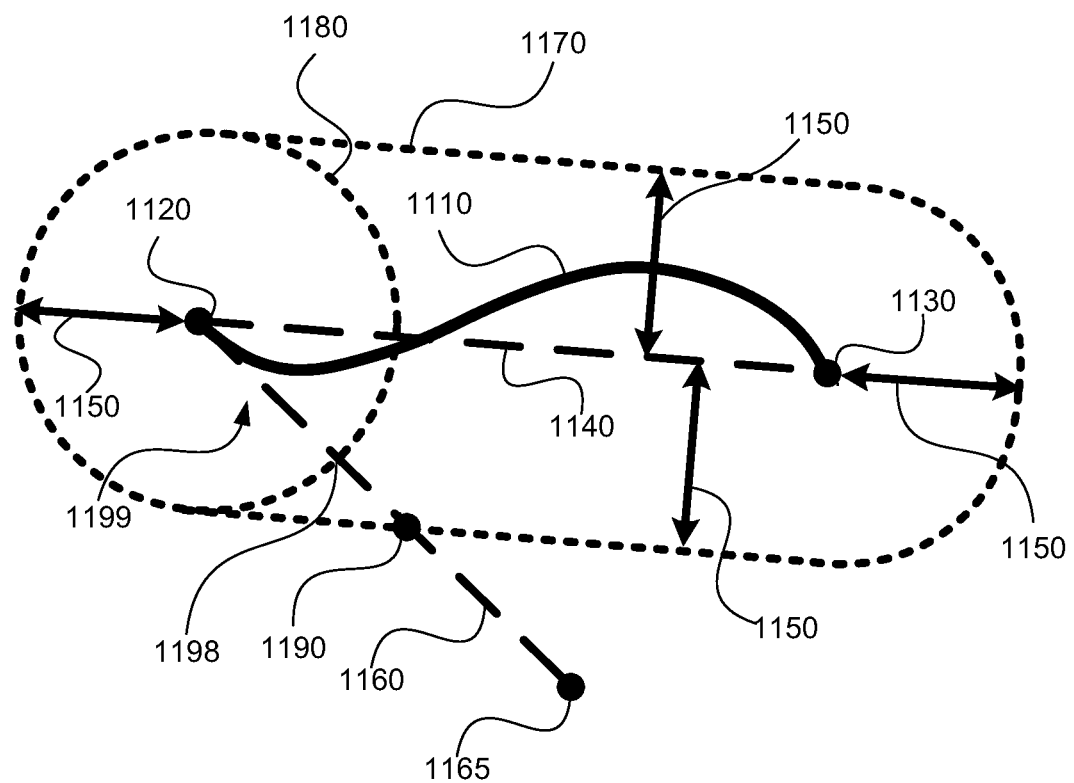
FIG. 11 is an example of a Bezier curve and an error bound used in calculating vectorization points on the endpoint tangents.

FIG. 11 illustrates how the vectorization resulting from FIG. 9 satisfies the flatness tolerance, which will be referred to as "eps" for convenience. FIG. 11 shows a part 1110 of a Bezier curve extending between an endpoint 1120 (which can be starting or ending) and a closest sample point 1130. A control point 1165 defines a tangent segment 1160 to the endpoint 1120. A dashed line 1140 shows a vectorized line segment between the endpoint 1120 and the closest sample point 1130. The dashed vectorized line segment 1140 guarantees a reduced flatness tolerance of half the actual flatness tolerance (eps/2), which means the most distant part of the input Bezier curve 1110 to the line segment 1140 is at most half the flatness tolerance (eps/2), being a distance 1150. The distance 1150 establishes a bound 1170 defined as the locus of points that have a distance of half the flatness tolerance (eps/2) to the line segment 1140. It can be seen geometrically that the bound 1170 is convex, and the distance of any point from within the bound 1170 to the input Bezier curve 1110 is at most the flatness tolerance (eps). In the preferred implementation, the tangent point (which can be starting or ending, such as 570 or 580 in FIG. 5) is chosen to be within or on a circle 1180 of radius (eps/2) centered at the endpoint 1120. In this example, an appropriate tangent point may be selected in the vicinity indicated by the arrow 1199 in FIG. 11 to clearly satisfy the flatness tolerance, but would ordinarily be selected at the intersection 1198 of the circle 1180 and the tangent 1160, thus satisfying the flatness tolerance whilst minimizing computational overhead. This process is described later with the aid of FIG. 12 and FIG. 13.

It should be noted that alternative approaches exist for maintaining the flatness tolerance when inserting the tangent point and the scope of the present disclosure is not limited to the steps described in process 900.

In one alternative approach, instead of bounding the tangent point within the circle 1180, the point is bounded by the shape 1170. Such is illustrated in FIG. 11 where a point 1190 lies on the tangent 1160 at the most furthest point away from the endpoint 1120.

In another alternative approach, the shape 1170 is expanded to a bigger shape, whilst still remaining convex and ensuring that the distance of any point from within the bigger shape to the curve is at most the flatness tolerance. The bigger shape can be constructed using the following steps:

(1) define a region bounded by two parallel lines that are separated by a distance of the flatness tolerance (eps), where both lines are equidistant from and parallel to the line segment 1140;

(2) intersect the defined region with two circles of radius eps/2 centred on the tangent point and the closest sample point; and (3) form the bigger shape by the union of the intersected region and the shape 1170.

The tangent point is similarly bounded by this bigger shape.

In another alternative approach, the application 133 may detect that the entire part of the curve lies on one side of a plane divided by the line segment 1140 (i.e. entirely to one side of the segment 1140). In this case, the bounding shape can be adjusted to be the locus of a point with a distance of the flatness tolerance (eps) to the line segment 1140, intersected with the side of the plane divided by the line 1140 on the same side as the curve. This shape is also convex and guarantees that any point within itself has a distance to the curve that is at most the flatness tolerance (eps). The tangent point can then be similarly limited to within the bounds of this altered shape.

Step 470 of adding a starting tangent point to the vectorized path will be explained in more detail with reference a sub-process 1200 shown in FIG. 12. The sub-process 1200 is executed using the processor 105 and begins with step 1210, where the endpoint epsilon created in step 910, and the endpoint sample step created in step 920, are retrieved from the memory unit 106 by the processor 105. The sub-process then moves onto step 1220 where a temporary variable, startL, is created in the memory unit 106. The processor 105 determines the smaller value between the (endpoint epsilon) and ((endpoint sample step)*(length of the starting tangent segment)), and that determined smaller value is written into startL. By ensuring that startL is at most the product of (endpoint step) and (length of the starting tangent segment), the smoothness of the vectorized curve is maintained. The sub-process 1200 then moves on to step 1230 where the processor 105 calculates a point ($P_{start}$) that lies on the starting tangent segment that has a distance of startL away from the starting point A. In an exemplary implementation, this can be evaluated by using the processor 105 to evaluate the following equations:

$$startTangentLen = \sqrt{(A.X - B.X)^2 + (A.Y - B.Y)^2} \quad \text{(Eqn. 7)}$$

$$P_{start}.X = A.X + \left(\frac{startL}{startTangentLen}\right)(B.X - A.X) \quad \text{(Eqn. 8)}$$

$$P_{start}.Y = A.Y + \left(\frac{startL}{startTangentLen}\right)(B.Y - A.Y) \quad \text{(Eqn. 9)}$$

where:

startTangentLen is the length of the tangent to the starting point defined by points A and B;

$P_{start}.X$ is the x-coordinate of the calculated point on the starting tangent segment;

$P_{start}.Y$ is the y-coordinate of the calculated point on the starting tangent segment;

A.X is the x-coordinate of the starting point of the input Bezier curve;

A.Y is the y-coordinate of the starting point of the input Bezier curve;

B.X is the x-coordinate of the starting control point of the input Bezier curve; and B.Y is the y-coordinate of the starting control point of the input Bezier curve.

When the is calculated, step 1230 continues by storing the result into memory 106 by writing the X ($P_{start}.X$) and Y ($P_{start}.Y$) coordinates of $P_{start}$ into the output path structure 810 at the index position 1. Once this is done, step 1230 finishes and sub-process 470 ends at step 1299.

Figure 13:
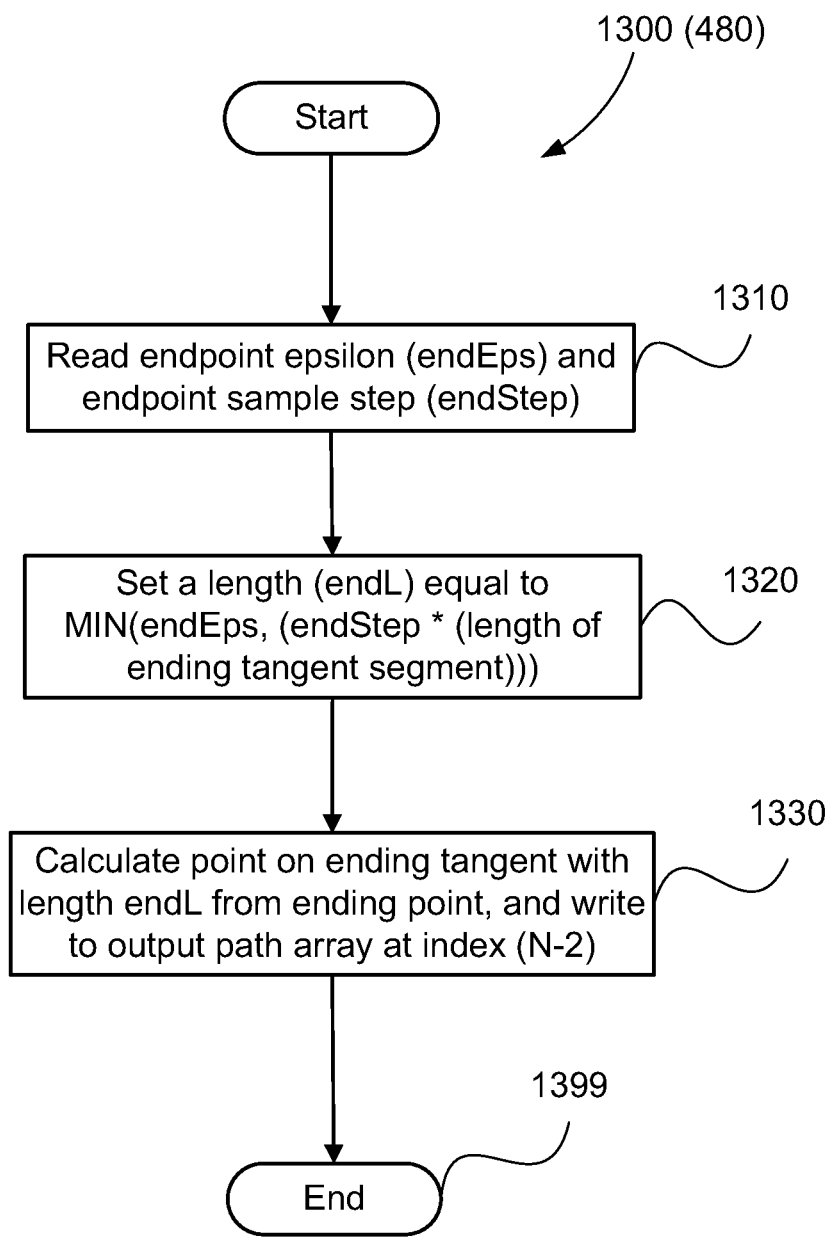
FIG. 13 is a flow diagram of a method of calculating a vectorization point on the ending tangent segment of a curve.

FIG. 13 is a block flow diagram of a sub-process 1300 implementing step 480 and which occurs after step 470. The sub-process 1300 involves the calculation of a point on the ending tangent segment and as such is very similar to sub-process 1200. The sub-process 1300 with step 1310 where the processor 105 reads the endpoint epsilon and endpoint sample step values from memory 106 that were calculated previously in steps 910 and 920 (460) respectively. Then the sub-process moves onto step 1320 where a temporary variable, endL, is created in memory 106. endL is set to have the smaller value of (endpoint epsilon) and ((endpoint sample step)*(length of the ending tangent segment)). Step 1330 calculates a point ($P_{end}$) on the ending tangent segment which lies a distance of endL away from the ending point, D. In an exemplary implementation, the position of point $P_{end}$ can be determined by the processor 105 evaluating the following equations:

$$endTangentLen = \sqrt{(C.X - D.X)^2 + (C.Y - D.Y)^2} \quad \text{(Eqn. 10)}$$

$$P_{end}.X = D.X + \left(\frac{endL}{endTangentLen}\right)(C.X - D.X) \quad \text{(Eqn. 11)}$$

$$P_{end}.Y = D.Y + \left(\frac{endL}{endTangentLen}\right)(C.Y - D.Y) \quad \text{(Eqn. 12)}$$

where:

endTangentLen is the length of the tangent to the ending point defined by points A and B;

$P_{end}.X$ is the x-coordinate of the calculated point on the ending tangent segment;

$P_{end}.Y$ is the y-coordinate of the calculated point on the ending tangent segment;

D.X is the x-coordinate of the ending point of the input Bezier curve;

D.Y is the y-coordinate of the ending point of the input Bezier curve;

C.X is the x-coordinate of the ending control point of the input Bezier curve; and C.Y is the y-coordinate of the ending control point of the input Bezier curve.

Once $P_{end}$ is calculated, step 1330 continues with the processor 105 storing the value in memory 106 by writing the X ($P_{end}.X$) and Y ($P_{end}.Y$) coordinates thereof into the output path array 810 at the index position N−2. Once this is completed, sub-process 1300 ends 1399.

The next and final step in the process 400 is step 490. In this step, the endpoint of the input curve, D, is written into the output path array at the index position N−1 (the last position). Once this has been completed by the processor 105, step 490 ends and thus the process 400 ends at step 499.

The steps 450 to 490 can be performed in any order, and alternative implementations to that described above may perform the steps 450 to 490 in a different order.

Figure 14A:
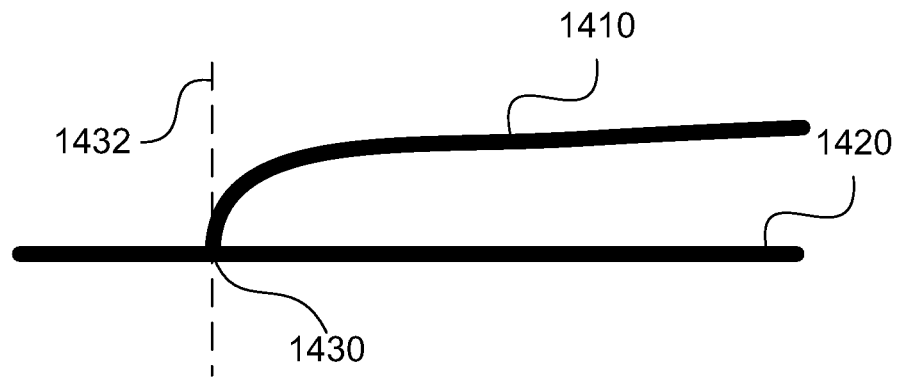
FIGS. 14A to 14C compare the output of a line stroker using an existing curve vectorization unit and the output of a stroker using the preferred embodiment of a curve vectorization unit.
Figure 14B:
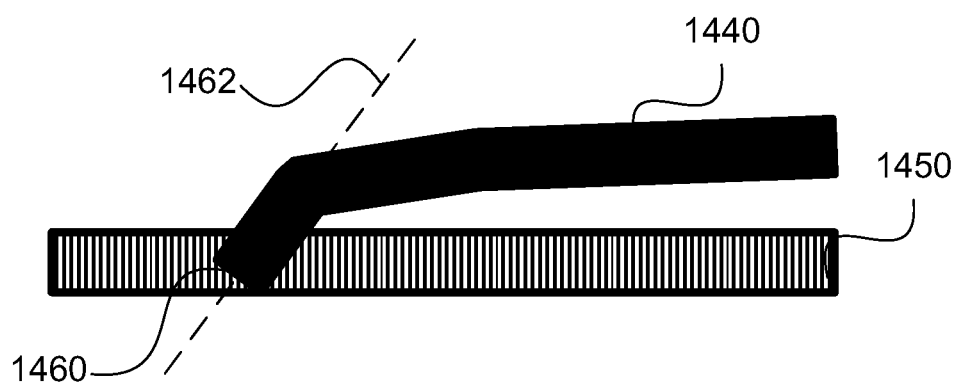
Figure 14C:
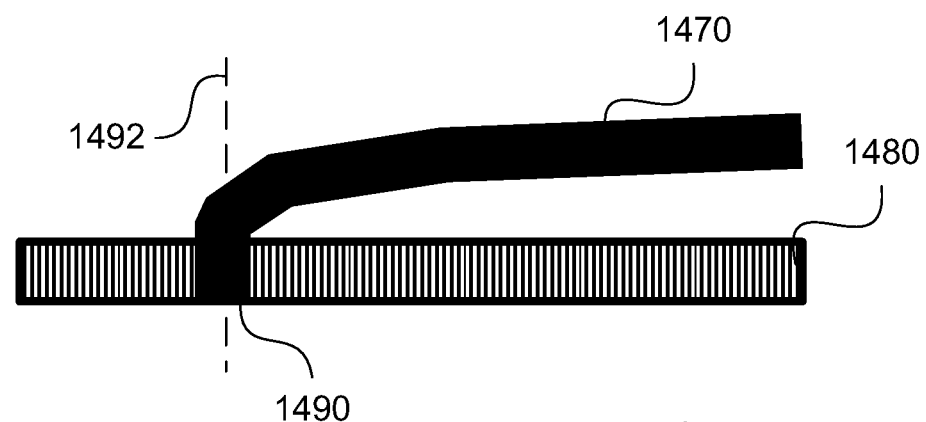

FIGS. 14A-14C, 15 and 16 aim to demonstrate the advantages the described embodiment provides over existing solutions. In FIG. 14A, a curve 1410 and a line 1420 are illustrated that are to be vectorized and then stroked for printing at a pre-determined stroke width. An endpoint 1430 of the curve 1410 is identified as that of interest. In FIG. 14B, stroked lines 1440 and 1450 show the results of stroking the two lines 1410 and 1420 respectively in a prior art fashion, where vectorization does not preserve the gradient of the tangents at the endpoint 1430. It can be seen that at the endpoint 1460 of the stroked line 1440, that the slope of a first vector 1462 does not match the original slope of the tangent 1432 to the original endpoint 1430, which is perpendicular to the line 1420. Thus when the line 1410 is stroked 1440 with a butt-endcap as illustrated, there exists an angle discrepancy that is visible to the end user, as seen in FIG. 14B. In FIG. 14C, stroked lines 1470 and 1480 show the results of stroking the two lines 1410 and 1420 respectively, using a stroker operating with vectorization according to the present disclosure. It can be seen that at the endpoint 1490 of the stroked line 1470, the first vector 1492 has the same slope as the tangent 1432 to the endpoint 1430 of the original curve 1410, and hence the intended angle between the stroked lines 1470 and 1480 has been maintained and there is no visible distraction to the end user.

Figure 15:
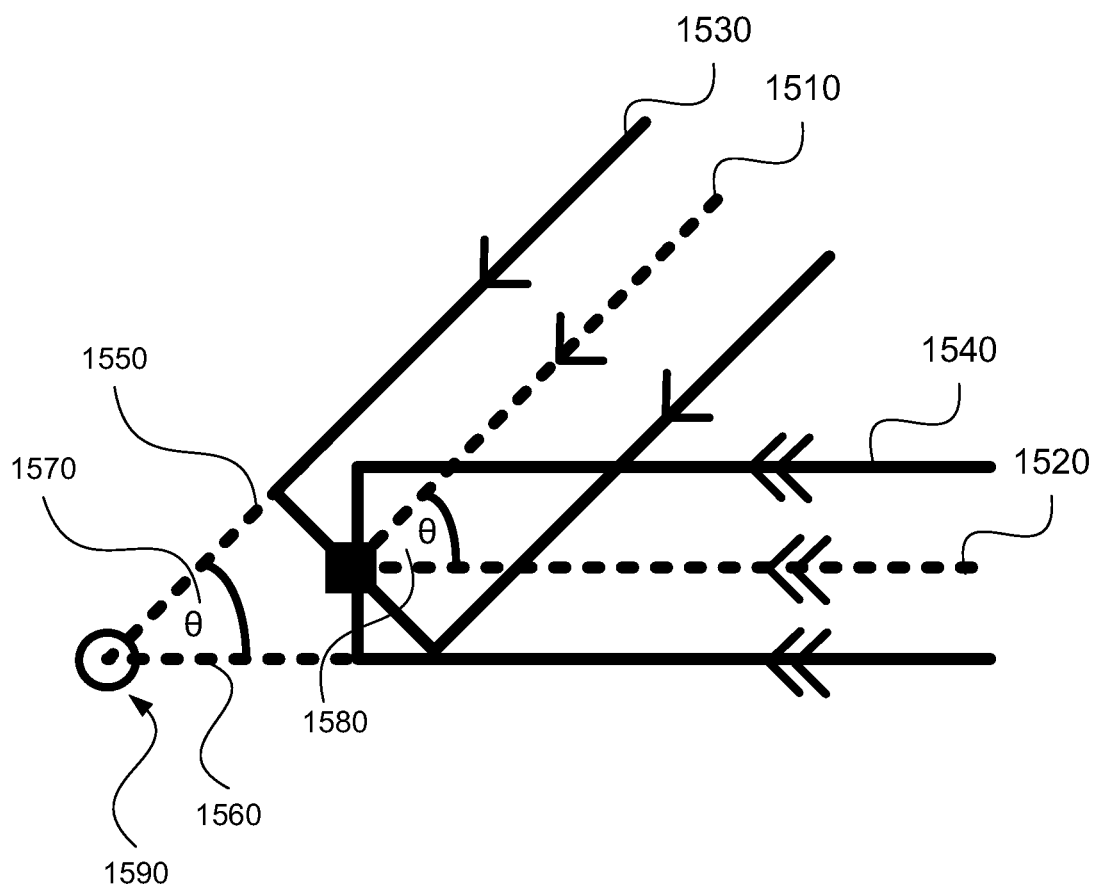
FIG. 15 is an example showing how a prior art mitre join is calculated between two lines.

FIG. 15 shows how a mitre join is created when two stroked lines are joined together in a prior art environment. Lines 1510 and 1520 are the lines that are to be stroked, and stroked lines 1530 and 1540 are the stroked results of the lines 1510 and 1520 formed by a stroker process executing within the computer 101. As seen, lines 1550 and 1560 of the outer edges of the stroked lines 1530 and 1540 are extended until they intersect as indicated by the arrow 1590. These lines 1550 and 1560 form the mitre join. It can be shown from geometric calculations that an angle 1570 formed by the intersection 1590 is the same in magnitude as the angle 1580 formed by the two original lines 1510 and 1520. If the angle between the two lines varies, then the angle, and hence size, of the mitre join changes. In some cases, a mitre limit is specified, where if the angle between the lines become too small, a bevel join is used instead.

Figure 16A:
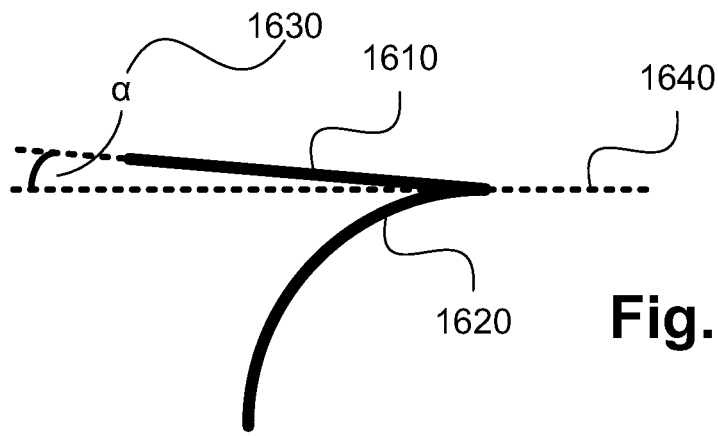
FIGS. 16A to 16C are comparative examples of the differences resulting from vectorization using a prior art curve vectorization unit and a curve vectorization unit according to the present disclosure, when stroking mitre joins.
Figure 16B:
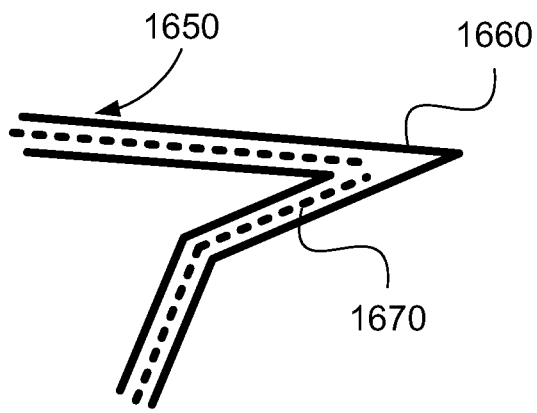
Figure 16C:
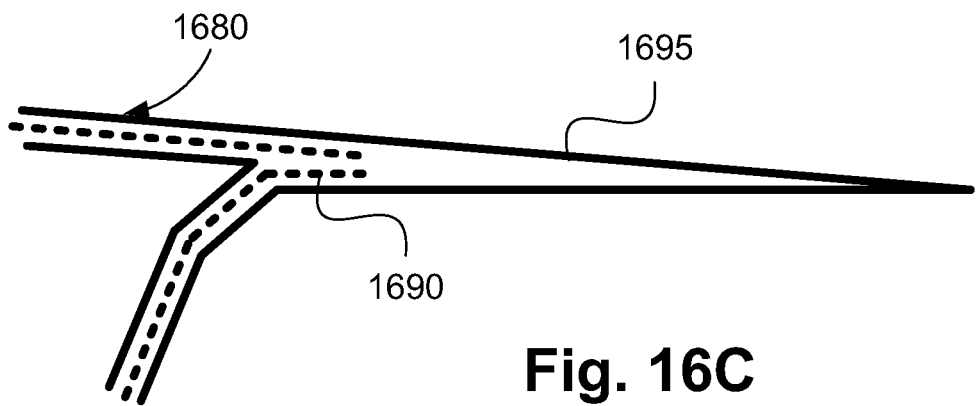

FIG. 16A shows a case where the endpoints of a straight line 1610 and a Bezier curve 1620 are joined using a mitre join. In FIG. 16A, it can be seen that the angle 1630 between the straight line 1610 and the tangent 1640 to the curve 1620 at an endpoint thereof, being the location of join, is very small, and thus the mitre join should be relatively long. FIG. 16B shows the output of a stroker using an existing prior art vectorization method to stroke the lines 1610 and 1620 at a pre-determined stroke width. The curve 1620 has been vectorized and the slope of vector 1670 at the endpoint does not match the original slope of the endpoint tangent 1640 of FIG. 16A. Because of this, the angle between the stroked line 1650 and last vectorized segment 1670 of the curve 1620 is much larger than the original angle 1630, and the mitre join 1660 becomes very short. In FIG. 16C, a stroker according to the present disclosure is used to vectorize the curve. Here, the endpoint vector 1690 has the same slope as the endpoint tangent 1640, and thus the angle between the stroked line and the last vector 1690 is preserved and the mitre join 1695 is stroked correctly. The length of the mitre join 1695 is very sensitive at small angles, and as such a small error in vectorizing the endpoints of a curve can result in errors in lengths that can be easily noticed by the end user.

Figure 18:
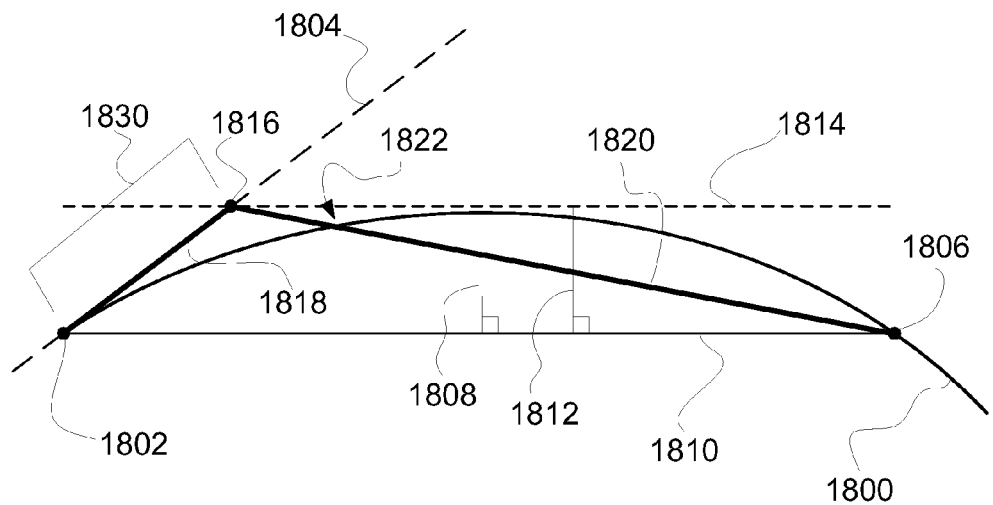
FIG. 18 illustrates the building of vectorized curve path from one endpoint.

FIG. 18 illustrates an implementation of curve vectorization from one endpoint where a particular tolerance is provided. A curve 1800 has an endpoint 1802 and a tangent 1804 associated with the curve 1800 at the endpoint 1802. Vectorization determines a first point 1806 on the curve 1800 following the endpoint 1802, where a maximum perpendicular distance 1808 between a first linear segment 1810, the segment 1810 joining the first point 1806 and the endpoint 1802, and the curve 1800, does not exceed the tolerance 1812. In this example, with respect to the first segment 1810, the tolerance 1812 is also represented as a line 1814 parallel to the segment 1810 and represents the flatness tolerance discussed above.

With the first segment 1810 established, vectorization then determines a second point 1816 on the tangent 1804 for which a maximum perpendicular distance from the first segment 1810 to the second point 1816 does not exceed the tolerance 1812. With the second point 1816 established, vectorization of the curve 1800 can commence by forming a path of a plurality of linear segments, the path of segments comprising for this example at a second segment 1818 joining the endpoint 1802 and the second point 1816, and a third segment 1820 joining the second point 1816 to the first point 1806. As seen in FIG. 18, the second segment 1818, being the first segment in this vectorized path, is coincident with the tangent 1804, and the third segment 1820, being the second segment in the vectorized path, crosses the curve 1800 as indicated at 1822. By crossing the curve at any point along the curve between endpoint 1902 and the first point 1806, or crossing the curve at the first point 1806 itself, the vectorization transits from a convex (outside) side of the curve to the concave (inside) part of the curve.

FIG. 18 illustrates curve vectorization proceeding from one endpoint 1802. In a preferred implementation, vectorization can also and additionally proceed from the other (not illustrated) endpoint of the curve 1800 in a corresponding fashion.

Figure 12:
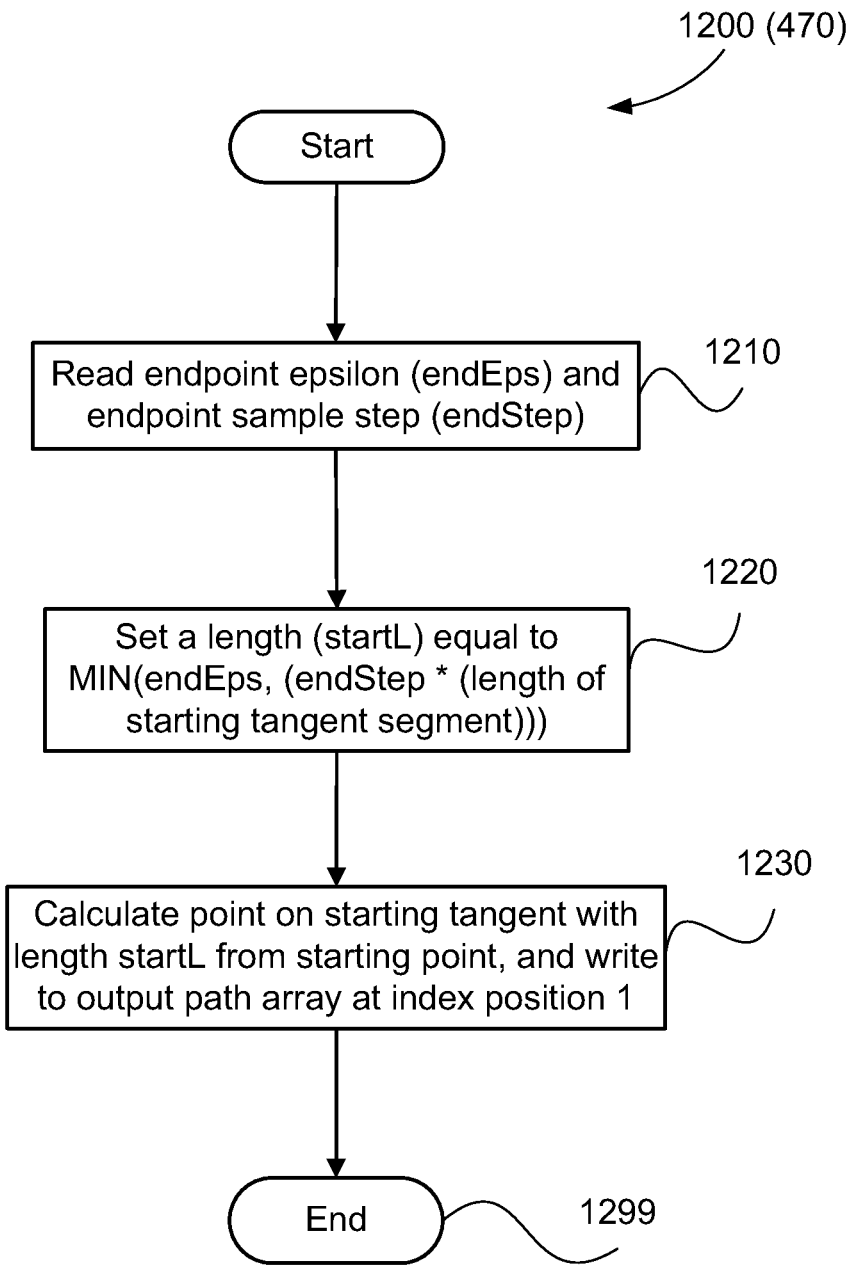
FIG. 12 is a flow diagram of a method of calculating a vectorization point on the starting tangent segment of a curve.

In a further implementation, as will be appreciated from the description associated with FIG. 12, a distance 1830 seen in FIG. 18 between the second point 1816 and the endpoint 1802 is preferably within the tolerance 1812. Having the distance 1830 within the tolerance 1812 provides for a much smoother or truer vectorization of the curve compared to having the second point lying outside the tolerance 1812. In the example of FIG. 18 the distance 1830 is clearly greater than the tolerance. Particularly, the distance 1830 shown in FIG. 18 is associated with the perpendicular distance 1812 of the flatness tolerance through geometry and the right-angled triangle that would be formed with that portion of the segment 1810, the distance 1818 and the segment 1818 on the tangent 1804. As such it will be appreciated that the distance 1830 as illustrated is a maximum distance, and the point 1816 may be modified so that the distance 1830 also satisfies the maximum perpendicular distance 1812.

Figure 19:
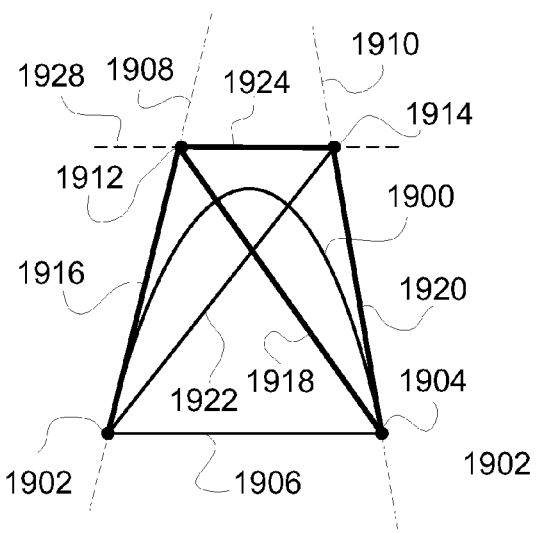
FIG. 19 shows a case of a very tight curve.

A specific example of vectorization is shown in FIG. 19 for the case of a very tight curve 1900 having endpoints 1902 and 1904. The curve 1900 in this example is very tight because the entirety of the curve 1900 lies with the vectorization flatness tolerance depicted by a line 1928. The effect of this is, where the approach of FIG. 18 is applied to, say, the endpoint 1902, which the previously described first point (e.g. 1806) on the curve 1900 coincides with the endpoint 1902. As such the above described first segment (e.g. 1810) is a segment 1906 linking the endpoints 1902 and 1904. Continuing the vectorization in the fashion described in FIG. 18 from the endpoint 1902 gives a second point 1912 and a (first) vectorizing path formed of segments 1916 and 1918. Performing the same vectorization but commencing at the endpoint 1904 results in a (second) vectorizing path formed of segments 1920 and 1922. In each case, the paths cross the curve 1900. Either the first or second path may therefore be a useful vectorized solution for the curve 1900. In such a case, rules may be established to determine which of the first or second path is used. For example the path having the shortest length may be selected.

A specific limiting case (not illustrated) may arise where the threshold line 1928 is sufficiently far from the curve 1900, that the tangents 1908 and 1910 intersect each other before intersecting the threshold 1928. In such a case, the points 1912 and 1914 would be coincident, and vectorization resolves into a path of two segments formed by those on the tangents 1916 and 1920. In this case the vectorizing path does not cross the curve 1900.

A third alternative to handle the special case of the very tight curve 1900 is to form the vectorized path by a further rule-based approach in which three segments are used. In this example, those segments may be the segments 1916 and 1920, and an intermediate segment 1924 joining the points 1912 and 1914. This results in a vectorizing path that also does not cross the curve 1900, and on convex side (or outside) of the curve 1900.

Figure 20:
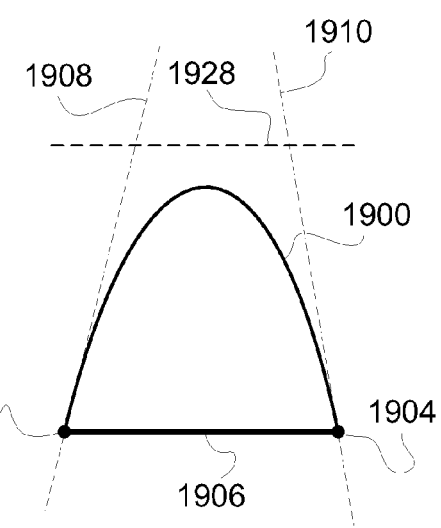
FIG. 20 shows an alternate manner of handling the curve of FIG. 19.

A fourth alternative is illustrated in FIG. 20 for the same special case curve 1900. Here the vectorizing path is selected by a rule-based approach to be the first segment 1906 directly connecting the endpoints 1902 and 1904. Here the vectorizing path is entirely within the concave part (or inside) the curve 1900 and does not cross the curve 1900.

Due to the high resolution of modern printer devices and rendering systems, the special cases of FIGS. 19 and 20 are likely to occur in only a small percentage of curves requiring vectorization. As such, the approaches described above with reference to FIGS. 5 and 18 are widely applicable to the vectorization of curves for rendering systems.

Figure 3A:
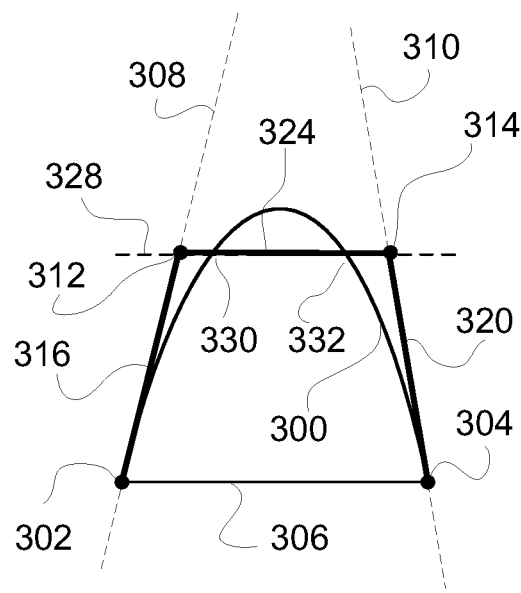
FIGS. 3A and 3B illustrate particular cases for curve vectorization.

FIG. 3A illustrates a case of a curve 300 having endpoints 302 and 304. The curve 300 may be considered is moderately tight because a vectorization flatness tolerance, depicted by a line 328 parallel to a segment 306 joining the endpoints 302 and 304, crosses the curve 300. Using the approach of FIGS. 4 and 5, vectorization identifies points 312 and 314 on respective tangents 308 and 310 of the endpoints 302 and 304. The points 312 and 314 define the vectorizing path formed by segments 316 and 320, each coincident with the corresponding tangent 308 and 310, and a third segment 324 connecting the points 312 and 314, and which crosses the curve 300, in this case twice, as seen at 330 and 332. In this example, vectorization does not determine any points on the curve 300, except for the two endpoints. The points 312 and 314 may be determined using an equivalent of the distance 1830 discussed above as relevant to the flatness tolerance applicable to vectorization. Provided the interconnecting intermediate segment 324 is within the flatness tolerance from the segment 306, such will be a valid vectorization.

Figure 3B:
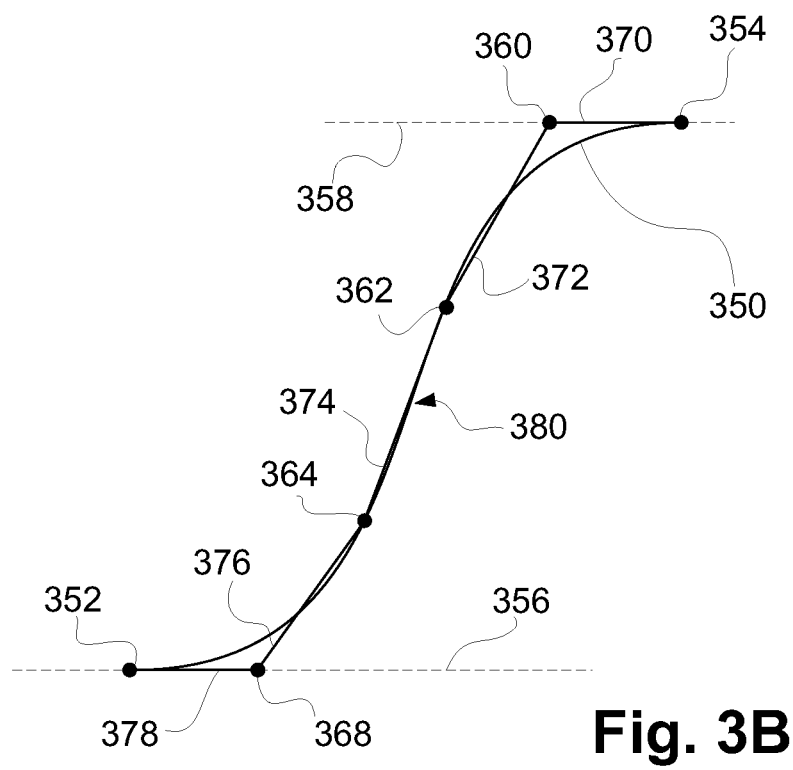

FIG. 3B illustrates a case of a cubic Bezier spline 350 having endpoints 352 and 354 each having corresponding tangents 356 and 358. Vectorization of the curve 350 according to the present disclosure establishes points 360 and 368 on the tangents 358 and 356 respectively and thus terminal segments 370 and 378 respectively. Although threshold lines are not illustrated for the sake of clarity, the number of further points used for vectorization will depend on the flatness threshold and the amount of curvature of the curve 350. In this example there are two further points 362 and 364 which in turn define vectorizing segments 372, 374 and 376, resulting in the path being formed by the segments 370-378. Note in this example there is no vectorization point associated with a point 380 of inflection of the curve 350. Further, whilst the segments 372 and 374 each cross the curve 350, so too does the segment 374.

Another approach of vectoring the cubic spline 350 of FIG. 3B is to identify the point of inflection 380, and vectorize the curve 350 in oppositely directed curve portions from that point 380. In each case, the initial segment on the tangent at the point 380 will be on the convex (outside) side of the curve portion being vectorized, which may then respectively proceed in the manner described with reference to FIG. 18.

The arrangements described are applicable to the computer and data processing industries and particularly for the accurate rendering of curved lines, particularly with stroking, in printing systems. In printing systems, the arrangements may be configured in computer apparatus within a printer comprising means for rendering the vectorized path to a hardcopy recording medium, such as paper.

The foregoing describes only some embodiments of the present invention, and modifications and/or changes can be made thereto without departing from the scope and spirit of the invention, the embodiments being illustrative and not restrictive.

This application claims the benefit under 35 U.S.C. §119 of the filing date of Australian Patent Application No. 2011202072, filed Apr. 21, 2011, hereby incorporated by reference in its entirety as if fully set forth herein.

What is claimed:

1. A method of vectorizing a curve, the curve having an endpoint and a tangent associated with the curve at the endpoint, the method comprising:
   determining a first point on the tangent for which a distance from the endpoint to the first point is associated with a flatness tolerance for vectorization;
   determining a second point on the curve following the endpoint where a maximum perpendicular distance from a line to the curve does not exceed the flatness tolerance, the line joining the second point and the endpoint; and
   vectorizing the curve by a path formed of a plurality of linear segments, the plurality of segments comprising at least a first segment joining the endpoint and the first point, and characterised by a second segment joining the first point to the second point and crossing the curve.

2. A method according to claim 1, wherein a distance between the second point and the endpoint is within the tolerance.

3. A method according to claim 1, further comprising the step of determining a third point on the curve following in sequence from the first point and the endpoint, wherein a perpendicular distance from a fourth segment to the curve satisfies the tolerance, the fourth segment joining the first point and the third point.

4. A method according to claim 1, wherein the third segment crosses the curve.

5. A method according to claim 3, wherein a path joining the second point and the third point crosses the curve at the first point.

6. A method according to claim 1, wherein the flatness tolerance defines a maximum perpendicular distance between the curve and each of the plurality of segments.

7. A method according to claim 1, further comprising rendering the curve by stroking the vectorized segments at a pre-determined stroke width.

8. A method of vectorizing a curve using a tolerance value, the curve having a first endpoint and a first tangent associated with the curve at the first endpoint and a second endpoint and a second tangent associated with the curve at the second endpoint, the method comprising the steps of:
   determining a first tangent point on the first tangent for which a distance from the first tangent point to the first endpoint does not exceed the tolerance value;
   determining a second tangent point on the second tangent for which a distance from the second tangent point to the second endpoint does not exceed the tolerance value; and
   vectorizing the curve by a path formed of a plurality of linear segments, the plurality of segments comprising at least a first segment joining the first endpoint and the first tangent point a second segment joining the second endpoint and the second tangent point, the second point, and at least one further segment joining the first tangent point and the second tangent point wherein a maximum perpendicular distance from the at least one further segment to the curve does not exceed the tolerance value.

9. A method according to claim 8 wherein the at least one further segment comprises at least two further segments, the further segments being joined by a point on the curve.

10. A method according to claim 9, wherein the at least two further segments cross the curve.

11. A method of vectorizing a curve, the curve having an endpoint and a tangent associated with the curve at the endpoint, the method comprising the steps of:
   determining a first point on the tangent for which a distance from the endpoint to the first point is associated with a flatness tolerance for vectorization;
   determining a second point on the curve following the endpoint where a maximum perpendicular distance from a line to the curve does not exceed the flatness tolerance, the line joining the second point and the endpoint; and
   vectorizing the curve by a path formed of a plurality of linear segments, the plurality of segments comprising at least a first segment joining the endpoint and the first point, and characterised by a second segment joining the first point to the second point and crossing the curve.

12. A method according to claim 11 wherein the crossing of the curve occurs at the second point.

13. A method according to claim 12 wherein the path further comprises a third segment between the second point and a third point on the curve.

14. A method of vectorizing a curve, the curve having an endpoint and a tangent associated with the curve at the endpoint, the method comprising the steps of:
   determining a first point on the tangent for which a distance from the endpoint to the first point is associated with a flatness tolerance for vectorization;
   determining a second point on the curve following the endpoint where a maximum perpendicular distance from a line to the curve does not exceed the flatness tolerance, the line joining the second point and the endpoint; and
   vectorizing the curve by a path formed of a plurality of linear segments, the plurality of segments comprising at least a first segment joining the endpoint and the first point, and characterised by a second segment joining the first point to the second point and the vectorized path crossing the curve at the first point.

15. A method of vectorizing a curve, the curve having an first point and a tangent, associated with the curve at the first point, the tangent defining a convex side of the curve, the method comprising the steps of:
   determining a second point on the tangent in the convex part for which a distance from the first point to the second point is associated with a flatness tolerance for vectorization, the first point and the second point defining a first segment;
   determining a third point on the curve such that a second segment joining the second point and the third point crosses the curve and satisfies the flatness tolerance; and
   vectorizing the curve by a path formed of a plurality of linear segments, the plurality of segments comprising at least the first segment and the second segment.

16. A method of vectorizing a curve, the curve having an first point and a tangent, associated with the curve at the first point, the tangent defining a convex side of the curve, the method comprising the steps of:
   determining a second point on the tangent in the convex part for which a distance from the first point to the second point is associated with a flatness tolerance for vectorization, the first point and the second point defining a first segment;
   determining a third point on the curve such that a second segment joining the second point and the third point satisfies the flatness tolerance; and
   vectorizing the curve by a path formed of a plurality of linear segments, the plurality of segments comprising at least the first segment and the second segment, the path characterized by at least a crossing with the curve.

17. A method according to claim 16 wherein each of the first segment and the second segment is within a maximum perpendicular distance from a line between the first point and the third point, thereby satisfying the flatness tolerance.

18. A non-transitory computer readable storage medium having a program recorded thereon, the program being executable by computer apparatus to vectorize a curve, the curve having an endpoint and a tangent associated with the curve at the endpoint, the program comprising:
   code for determining a first point on the tangent for which a distance from the endpoint to the first point is associated with a flatness tolerance for vectorization;
   code for determining a second point on the curve following the endpoint where a maximum perpendicular distance from a line to the curve does not exceed the flatness tolerance, the line joining the second point and the endpoint; and
   code for vectorizing the curve by a path formed of a plurality of linear segments, the plurality of segments comprising at least a first segment joining the endpoint and the first point, and characterised by a second segment joining the first point to the second point and crossing the curve.

19. Computer apparatus comprising a processor, a memory device coupled to the processor and having a program stored therein, an input for receiving a curve, the program being executable by the processor to vectorize the curve to form a path, and an output for the path, the curve having an endpoint and a tangent associated with the curve at the endpoint, the program comprising:
   code for determining a first point on the tangent for which a distance from the endpoint to the first point is associated with a flatness tolerance for vectorization;
   code for determining a second point on the curve following the endpoint where a maximum perpendicular distance from a line to the curve does not exceed the flatness tolerance, the line joining the second point and the endpoint; and code for vectorizing the curve by which the path is formed of a plurality of linear segments, the plurality of segments comprising at least a first segment joining the endpoint and the first point, and characterised by a second segment joining the first point to the second point and crossing the curve.

20. A printer comprising computer apparatus according to claim 19, wherein the output comprises means for rendering the path to a hard-copy recording medium.

* * * * *